United States Patent [19]

Sugiyama et al.

[11] Patent Number: 5,790,745
[45] Date of Patent: Aug. 4, 1998

[54] VARIABLE TRANSFER RATE CONTROL CODING APPARATUS, REPRODUCING APPARATUS AND RECORDING MEDIUM

[75] Inventors: Kenji Sugiyama, Yokosuka; Kanji Kayanuma, Hadano; Ichiro Ando, Yokosuka, all of Japan

[73] Assignee: Victor Company Of Japan, Ltd., Yokohama, Japan

[21] Appl. No.: 731,373

[22] Filed: Oct. 11, 1996

Related U.S. Application Data

[63] Continuation of Ser. No. 142,280, Oct. 28, 1993, abandoned.

[30] Foreign Application Priority Data

Oct. 28, 1992 [JP] Japan ............................. 4-312757
Nov. 26, 1992 [JP] Japan ............................. 4-339720

[51] Int. Cl.⁶ .......................... H04N 5/76; H04N 5/92
[52] U.S. Cl. .................................... 386/111; 386/112
[58] Field of Search .......................... 348/405, 416,
 348/419, 390; 386/33, 14, 86, 95, 109,
 111, 112; 358/906, 909.1; 360/8; H04N 5/76,
 5/91, 5/92, 9/79, 7/133, 7/137

[56] References Cited

U.S. PATENT DOCUMENTS

| 5,313,471 | 5/1994 | Otaka et al. ............... 358/310 |
| 5,349,383 | 9/1994 | Parke et al. ............... 348/419 |
| 5,349,384 | 9/1994 | Oguro ........................ 358/335 |
| 5,367,335 | 11/1994 | Murakami et al. ......... 348/419 |
| 5,381,275 | 1/1995 | Nitta et al. ................ 386/112 |
| 5,410,351 | 4/1995 | Kojima ....................... 348/419 |
| 5,432,769 | 7/1995 | Honjo ........................... 369/60 |
| 5,471,450 | 11/1995 | Yonemitsu et al. ......... 369/60 |
| 5,557,419 | 9/1996 | Muto ........................ 386/111 |
| 5,570,132 | 10/1996 | De With et al. ........... 386/112 |
| 5,594,598 | 1/1997 | Shikakura ................. 386/109 |

FOREIGN PATENT DOCUMENTS

| 0380081 | 8/1990 | European Pat. Off. . |
| 0444918 | 9/1991 | European Pat. Off. . |
| 63-151225 | 6/1988 | Japan . |
| 2-194734 | 8/1990 | Japan . |
| 3-263927 | 11/1991 | Japan . |
| 4-227185 | 8/1992 | Japan . |
| 4-227186 | 8/1992 | Japan . |
| 4227185 | 8/1992 | Japan ............................. H04N 7/133 |

OTHER PUBLICATIONS

Frequenz, vol. 46, no. 3/4 Mar. 1992, Berlin DE, pp. 81–86, Speiidel 'Codierung und Übertragung von Bewegtbildern—Stand der Entwicklung und Trends'.

IEEE Transactions on Consumer Electronics, vol. 37, no. 3, Aug. 1991, New York US, Yoneda et al. 'An Experimental Digital VCR With New DCT-Based Bit-Rate Reduction System' pp.275–282.

IEEE Transactions On Consumer Electronics, vol. 35, no. 2, May. 1989, New York US, pp. 97–105, Chao et al. 'A Pocket Vidio/Audio System Using The Asynchronous Transfer Mode Technique'.

*Primary Examiner*—Thai Tran
*Attorney, Agent, or Firm*—Lowe,Price, LeBlanc & Becker

[57] ABSTRACT

A variable transfer rate control coding apparatus which can distribute codes of an amount most suitable to the contents of a moving picture to be recorded and to a recording medium, on which information is recorded by this transfer rate coding apparatus, by obtaining an amount of codes to be temporarily generated in each unit period of time by a temporary or tentative coding, and then storing a temporary transfer rate (namely, a value of the temporary amount of codes to be generated in each unit period of time), and setting a target transfer rate (namely, a target value of an amount) of codes to be sent in each unit period of time from a total of the temporary transfer rates and the recordable capacity of the recording medium and next performing an actual or real coding according to the target transfer rates.

24 Claims, 11 Drawing Sheets

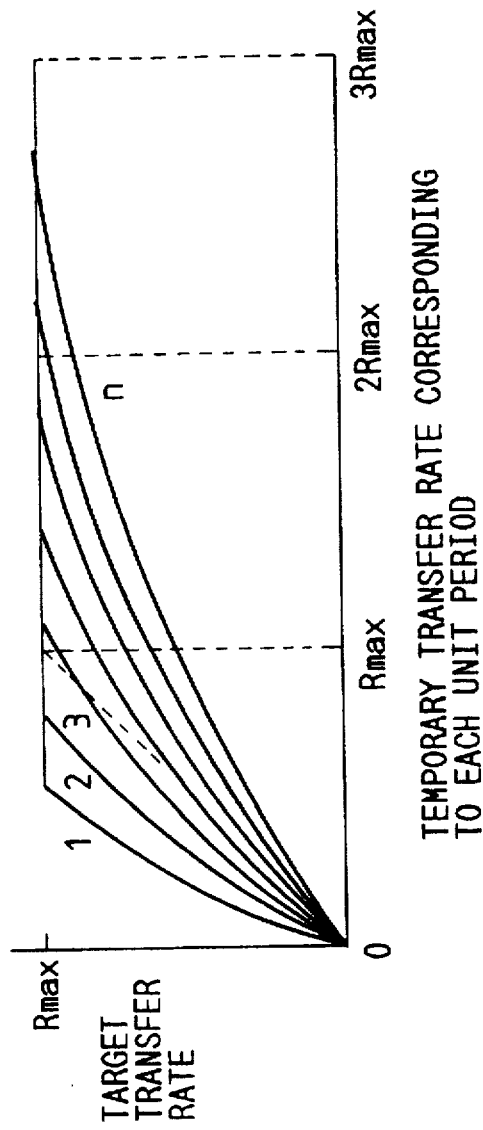

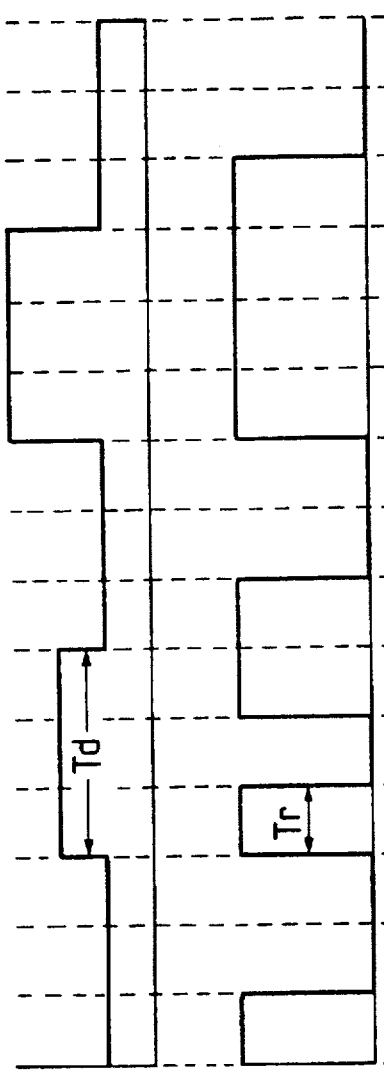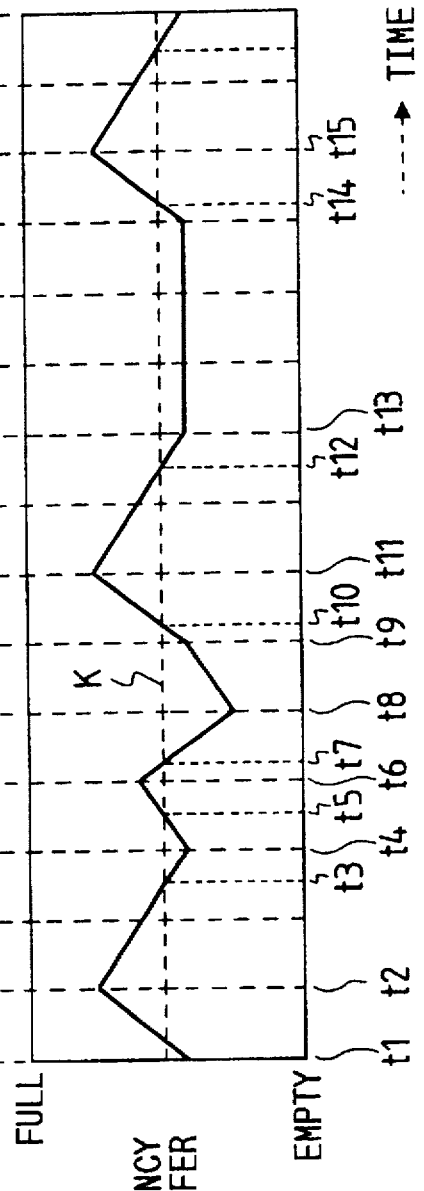
FIG. 10(a) DECODING RATE
FIG. 10(b) READING RATE
FIG. 10(c) OCCUPANCY OF BUFFER

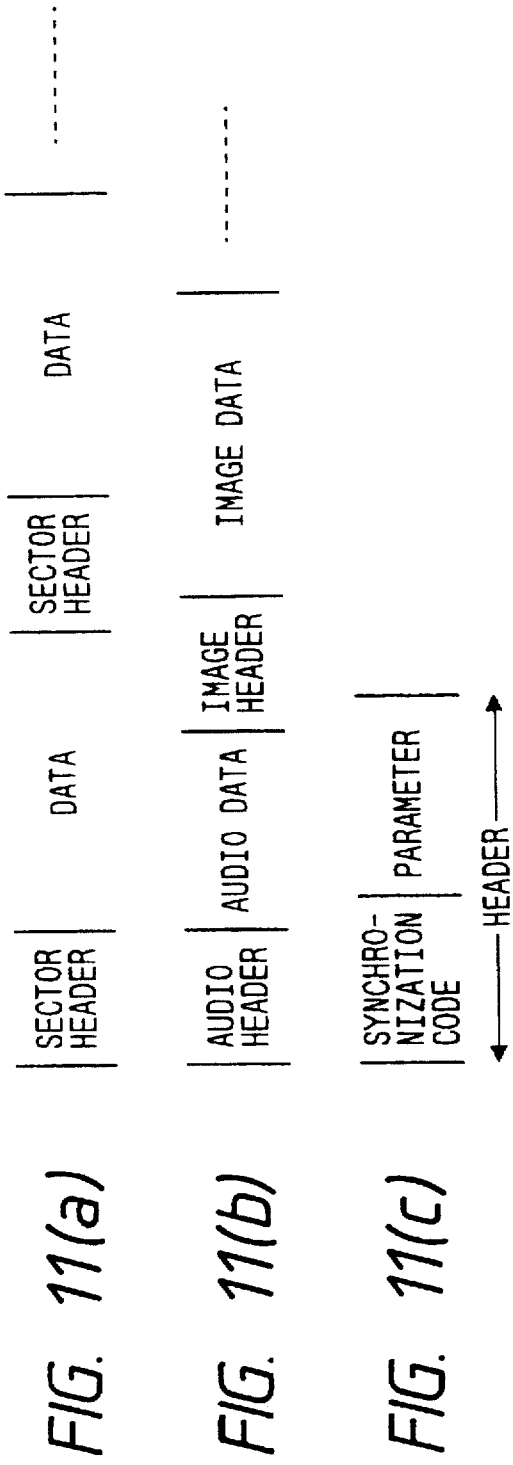
FIG. 11(a)
FIG. 11(b)
FIG. 11(c)
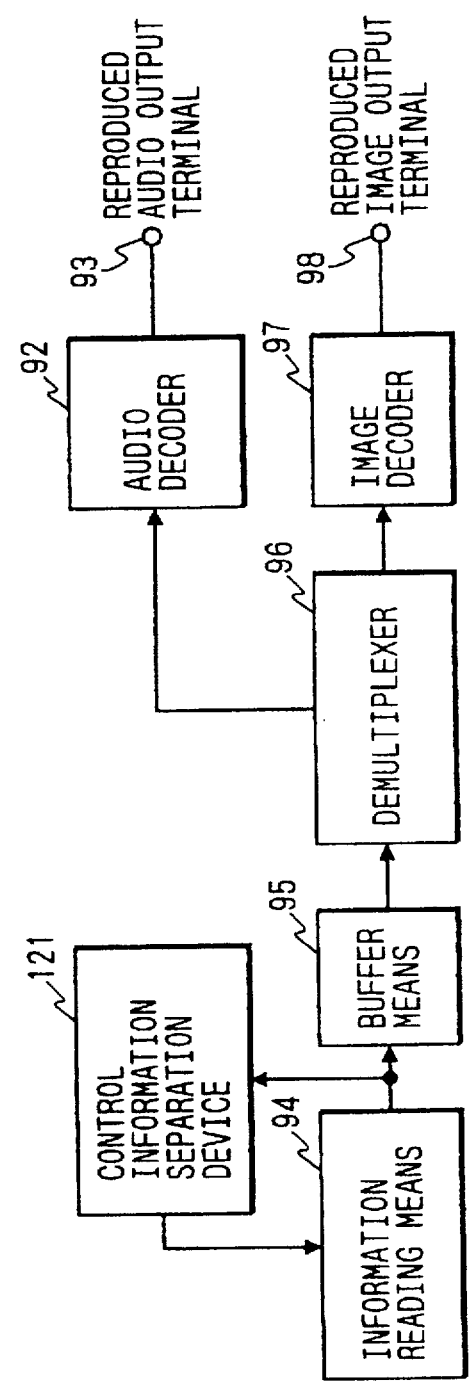
FIG. 12

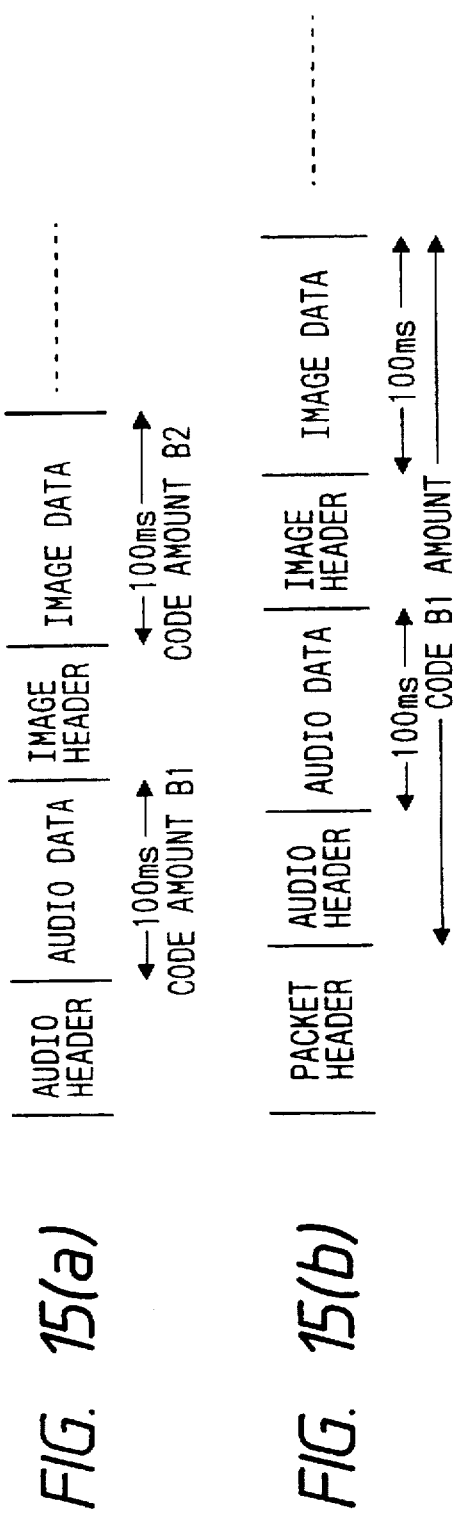
FIG. 15(a)
FIG. 15(b)
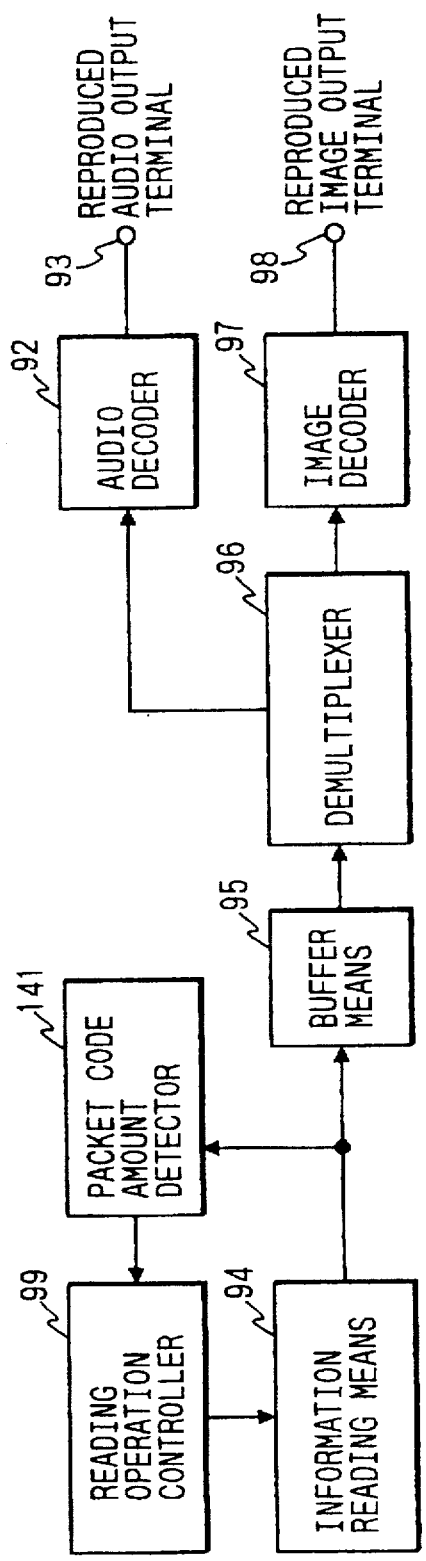
FIG. 16

VARIABLE TRANSFER RATE CONTROL CODING APPARATUS, REPRODUCING APPARATUS AND RECORDING MEDIUM

This application is a continuation of application Ser. No. 08/142,280 filed Oct. 28, 1993, now abandoned.

BACKGROUND OF THE INVENTION

1. Field of The Invention

This invention generally relates to a highly-efficient encoding technique to be employed for efficiently performing a coding (or encoding) in digital-signal recording, transmission and display apparatuses to generate a smaller amount of codes (hereunder sometimes referred to simply as code amount). More particularly, this invention relates to a coding apparatus adapted to perform a coding of a moving picture signal by controlling a transfer rate and also relates to a recording medium on which a code generated by the coding apparatus is recorded. Further, this invention relates to a reproducing apparatus for reading moving picture information from the recording medium. More particularly, this invention relates to a variable transfer rate recording information reproducing apparatus for reproducing moving picture information recorded on a recording medium, which information represents a code generated by changing an amount of information corresponding to a predetermined period of time, and also relates to the recording medium on which the moving picture information is recorded.

2. Description of The Related Art

When a variable length code is used in performing a highly efficient coding of an image signal, a part of an image represented by the image signal, which part contains a small amount of image information, is coded or converted into a small amount of codes. Therefore, it is reasonable for increasing the efficiency of coding to employ a variable length coding. Especially, in case of an inter-image predictive coding of each frame or field of a moving picture, an amount of codes corresponding to a part having no motion is very little. Thus, the efficiency of transmission or recording of information or codes can be increased if the transmission or recording is effected by making the visual picture quality of a moving picture nearly constant and changing a transfer rate according to an aspect of the moving picture.

Such a way of transmitting information is called an asynchronous transmission mode (ATM) which is extensively studied as a packet transmission in the field of communication. In this case, basically, codes are generated at a predetermined transfer rate. Further, packets (or cells) are discarded on a transmission network if necessary. Thus, an amount of information or codes is controlled.

Meanwhile, in case of recording media termed package media (for example, a video tape recorder (VTR), a video disk or the like as presently used), information is recorded thereon at a predetermined tape speed or a predetermined rotational speed. As the result, an amount of information recorded on the recording medium in a unit period of time (or a unit time slot) becomes constant. Therefore, the capacity of the recording medium can be indicated in terms of the length of available recording time. For instance, in case that a moving picture of 100 minutes is recorded on a recording medium whose maximum recording time is 120 minutes, the remaining capacity of the recording medium corresponding to the recording time of 20 minutes is space for recording another picture.

To make the most of the capacity of a recording medium, a transfer rate should be changed according to the contents of a picture to be recorded and thus the total amount of codes recorded thereon should be suited to the capacity thereof. However, in case of a conventional coding apparatus, the transfer rate is fixed to a constant value as will be described hereinbelow by referring to FIG. 1.

FIG. 1 is a schematic block diagram for illustrating the configuration of an example of the conventional coding apparatus. Incidentally, the coding apparatus of FIG. 1 is in conformity with CCITT (International Telegraph and Telephone Consultative Committee) specified standard system.

As shown in this figure, image signals are inputted to a predictive subtracter 2 and an activity detector 4 through an image input terminal 31. Incidentally, what is called activity indicates a degree of change in data, which is represented by an image signal, between adjacent blocks. In the predictive subtracter 2, an inter-frame prediction signal (hereunder sometimes referred to simply as a prediction signal) inputted from an inter-image predicting device 13 is subtracted from the image signal. Then, a prediction residual signal representing a result of the subtraction is outputted from the predictive subtracter 2 to a discrete cosine transform (DCT) device 3.

Next, in the DCT device 3, a DCT is performed on the prediction residual signal. Then, a signal representing a result of the DCT is outputted from the DCT device 3 to a quantizer 6 whereupon a quantization is effected according to a quantization step width (namely, a quantization step size) designated by information inputted from a quantization controller 5 thereto.

The quantized signal is next inputted to a variable length coder 7 and a local decoder 15. Further, in the device 7, information represented by the inputted signal is converted into a compressed code. Subsequently, a signal representing the compressed code is inputted to a buffer 32. Note that data (namely, the compressed code) inputted to the buffer 32 is converted by the device 7 into a variable length code. Thus, an amount of generated codes changes or fluctuates constantly. However, such change in amount of the generated codes is absorbed by the buffer 32. As the result, the generated code is outputted to a decoding apparatus (shown in FIG. 3) from a code output terminal 11 at a constant transfer rate.

On the other hand, in the local decoder 15, an inverse quantization and an inverse DCT are performed on the quantized signal inputted thereto. Thereby, the code is decoded and as a consequence, a reproduced prediction residual signal is produced. Then, the reproduced prediction residual signal is inputted to an adder 14 whereupon the inter-frame prediction signal inputted from the inter-image predicting device 13 is added to the reproduced prediction residual signal inputted from the local decoder 15. Subsequently, a reproduced image signal representing a result of this addition is supplied to an inter-image predicting device 13 whereupon the reproduced image signal is delayed by one frame and a motion compensation is effected to generate an inter-frame prediction signal. The generated inter-frame signal is supplied from the inter-image predicting device 13 to the prediction subtracter 2 and the adder 14.

Further, the quantization is controlled according to what is called an occupancy of the buffer and to the activity of an original image.

Thus, information representing the occupancy of the buffer 32 and the activity detected by the activity detecting device 4 is inputted to the quantization controller 5 whereupon a quantization step width is set according to the inputted information. Further, a signal indicating the quantization step width is inputted to the quantizer 6. Incidentally, the quantization step width is set in such a manner to be wide (namely, quantization is coarse) when many codes are stored in the buffer 32 and to be narrow (namely, quantization is fine) when the buffer 32 is almost empty. Such a characteristic of the quantization step width is shown in FIG. 2.

FIG. 2 is a diagram for illustrating the manner of the quantization control, which shows an example of the relation between the occupancy of the buffer and the quantization step width.

In case of controlling the quantization according to the activity, the quantization step width is wide (namely, the quantization is coarse) when the activity is large. Further, the quantization step width is narrow (namely, the quantization is fine).

This is due to the facts that in case of a block having large activity, change in image signal is large and thus an error is not noticeable and that in contrast, in case of a block having small activity, even a small error is conspicuous.

Practically, the value of the quantization step width set according to the occupancy of the buffer is multiplied by a multiplier which ranges from (½) to 2 and is set according to the activity, regarding each block.

At that time, if the average value of the activity is 1, the average value of the quantization step width does not change.

In case of this conventional coding apparatus, for instance, a variance of tone levels (or density levels) of pixels of a block is employed as an activity. Incidentally, when using DCT or the like, a quantization error is conspicuous in a block of an edge portion. Therefore, it is preferable that an edge portion is detected before the activity is determined, and subsequently, the activity of a block of the detected edge portion is regulated in such a way not to become large.

By using the activity of an input image as described above, subjective visual picture quality can be made to be uniform.

Next, a conventional decoding apparatus will be described hereinbelow by referring to FIG. 3.

FIG. 3 is a schematic block diagram for illustrating the configuration of an example of the conventional decoding apparatus.

As shown in this figure, codes inputted from a code input terminal 20 to a buffer 41 at a constant transfer rate are outputted to a variable length decoder 22 in synchronization with a processing to be effected therein.

In the variable length decoder 22, the variable length code is converted into a fixed length code. Then, in the dequantizer 23, the fixed length code is converted into a quantization representative value (hereunder sometimes referred to simply as a quantization representative). The quantization representative is inputted to an inverse DCT device 24 whereupon an inverse DCT is performed on the quantization representative to produce a reproduction predictive residual signal. Then, the reproduction predictive residual signal is applied to the adder 14.

Next, in the adder 14, a prediction signal inputted from the inter-image predictor 13 is added to the reproduction predictive residual signal to generate a signal (hereunder referred to as a reproduced image signal) representing a reproduced image. This reproduced image signal is outputted from an image output terminal 25. Further, the reproduced image signal is also inputted to the inter-image predictor 13.

However, as described above, in case of the conventional coding apparatus, the transfer rate is controlled in such a manner to be constant. Thus, the conventional coding apparatus has a drawback in that although an amount of codes corresponding to a portion of an image is sufficient and a corresponding quantization step width is too narrow, an amount of codes corresponding to another portion of the image is insufficient and a corresponding quantization step width is large (namely, quantization is coarse) and thus the picture quality is degraded.

Further, in case of the conventional coding apparatus, a coding is performed at a constant transfer rate irrespective of the length (or duration) of a moving picture. Thus, the conventional coding apparatus has another drawback in that if the length of a moving picture is shorter than the maximum recordable time of a recording medium to be used to record the moving picture, a part of the recordable area of the recording medium remains unused.

Meanwhile, in case of an apparatus for reproducing information from a recording medium as above described, it is usual that information representing an image or an audio is continuously read and reproduced from the medium and thus there is no necessity of special control of reproduction of the information.

In case of a constant-line-velocity (CLV) disk medium in which a line velocity is constant, a rotational frequency should be changed according to the position on a disk. However, the rotational frequency dose not depend on the contents of information (for example, an amount of codes corresponding to information to be recorded for a predetermined period of time) but depend on the position on the disk.

It is preferable for making the most of the capacity of a recording medium that the transfer rate for transferring image information to be recorded is changed according to the contents of a picture to be recorded (for instance, an amount of codes corresponding to a predetermined period of time) in such a manner to vary with portions of an image represented by the image information and that the image information is recorded as what is called variable transfer rate information and is reproduced from the recorded variable transfer rate information.

However, in case of the conventional coding apparatus, it is not possible that the relative speed between a recording medium and a reproducing head is changed frequency and quickly according to the transfer rate for transferring the variable transfer rate information. Thus, in case of the conventional coding apparatus, moving picture information is first recorded at a fixed transfer rate. Thereafter, the recorded moving picture information is continuously read as fixed transfer rate information. Therefore, the prior art has a drawback in that variable transfer rate information can not be reproduced from a recording medium on which the variable transfer rate information is recorded by changing the transfer rate each predetermined period of time.

The present invention is accomplished to eliminate the above described drawbacks of the prior art.

It is, therefore, an object of the present invention to provide a variable transfer rate control coding apparatus which and to a recording medium on which information is recorded by this variable transfer rate control coding apparatus.

Further, it is another object of the present invention to provide a variable transfer rate moving picture information reproducing apparatus which can reproduce variable transfer rate moving picture information (namely, moving picture information coded and recorded on a recording medium by changing a variable transfer rate) from the recording medium at the time of decoding thereof without changing the relative speed between the recording medium and the reproducing head and to provide a recording medium suitable for the recording of the variable transfer rate moving picture information by the reproducing apparatus.

SUMMARY OF THE INVENTION

To achieve the foregoing object, in accordance with an aspect of the present invention, there is provided a variable transfer rate control coding apparatus which can distribute codes of an amount most suitable to the contents of a moving picture to be recorded on a recording medium and to a recording medium by obtaining an amount of codes to be temporarily generated in each unit period of time by a temporary or tentative coding, and then storing a value of the temporary amount of codes to be generated in each unit period of time (hereunder sometimes referred to as a temporary transfer rate), and setting a target value of an amount (hereunder sometimes referred to as a transfer rate) of codes to be sent in each unit period of time (namely, setting a target transfer rate) from a total of the temporary transfer rates and the recordable capacity of the recording medium and next performing an actual coding (hereunder sometimes referred to as a real coding) according to the target transfer rates. Moreover, there is provided a recording medium on which information is recorded by this variable transfer rate coding apparatus.

Namely, the variable transfer rate coding apparatus for performing a coding on a moving picture signal, which comprises temporary coding means for obtaining a temporary transfer rate representing an amount of codes to be generated in each unit period of time from the moving picture signal and target transfer rate setting means for setting a target transfer rate corresponding to each unit period of time from the temporary transfer rate in such a manner that a total amount of codes generated from the moving picture signal is equal to a predetermined value. Thus, a coding of the moving picture signal is effected by controlling an amount of generated codes in accordance with the target transfer rate corresponding to each unit period of time.

Further, the target transfer rate setting means of a preferred embodiment (namely, a variable transfer rate control coding apparatus) of the present invention is provided with a transfer rate converting device which converts the temporary transfer rate corresponding to each unit period of time into the target transfer rate corresponding to each unit period of time by making increase in the target transfer rate be less than increase in the corresponding temporary transfer rate and limiting the maximum value of the target transfer rate to a predetermined constant value.

Furthermore, in a preferred embodiment (namely, a recording medium) of the present invention, the transfer rate of the moving picture information recorded thereon is not constant, and an amount of codes recorded thereon and generated from the entire moving picture is made to be nearly equal to the available (or recordable) capacity of the recording medium.

Thus, as described above, in case of the variable transfer rate control coding apparatus, an amount of codes to be temporarily generated in each unit period of time is obtained by a temporary coding, and thereafter a target value of an amount (hereunder sometimes referred to as a transfer rate) of codes to be sent in each unit period of time (namely, setting a target transfer rate) is set from a total of the temporary transfer rates and the recordable capacity of the recording medium and finally, an actual coding is performed according to the target transfer rates. As the result, an amount of codes corresponding to a portion of an image, the quantization of which would be excessively fine in case of the conventional coding apparatus, becomes small and an amount of codes corresponding to another portion of an image, the picture quality of which would be degraded by coarse quantization in case of the conventional coding apparatus, becomes large.

Thus, in accordance with the present invention, amounts of codes are suitably distributed to portions of the image according to the contents of information representing the portions, and moreover the picture quality is improved. Furthermore, the target transfer rate corresponding to each unit period of time is set in such a manner that a total amount of codes is constant. Therefore, by controlling a coding according to the target transfer rate, even if the length or duration of a moving picture is changed, all codes are recorded on the recording medium without waste thereof. Further, in accordance with the present invention, fluctuation in quantized value becomes small and as a consequence, change in picture quality due to the control of a coding becomes also small.

Especially, regarding an inter-image prediction coding, an amount of data generated corresponding to a portion, in which there is no motion, of a picture is small. Consequently, the picture quality is improved sharply.

Further, although the transfer rate may vary with unit periods of time, the transfer rate is unchanged within each unit period of time. Thus, the variable transfer rate control coding and decoding apparatuses of the present invention have good compatibilities with fixed transfer rate coding and decoding apparatuses, respectively. Further, the formers can be realized by adding systems each for controlling a total amount of codes to the latter, respectively.

Moreover, if the variable transfer rate control coding apparatus of the present invention and the conventional coding apparatus use a recording medium of same recording capacity and obtain same picture quality, the variable transfer rate control coding apparatus of the present invention can record longer than the conventional coding apparatus does.

Furthermore, the recording medium of the present invention is a medium on which image information is recorded by the variable transfer rate control coding apparatus of the present invention. Each time when a unit period of time passes, the transfer rate is controlled or regulated according to the contents of a portion, which corresponds to a unit period of time, of information to be recorded, the total amount of codes obtained from the information and the recording capacity of the recording medium. Thus, information is recorded on the full recording capacity of the recording medium. Consequently, the picture quality of a moving picture reproduced from the recording medium is much better than that of a moving picture reproduced from codes recorded by the conventional coding apparatus employing a fixed transfer rate.

As described above, the variable transfer rate control coding apparatus and the recording medium of the present invention have excellent effects in practical use.

Further, in accordance with another aspect of the present invention, there is provided a variable transfer rate information recording medium, on which moving picture information is recorded by changing the transfer rate and on which reading operation control information is also recorded in a multiplex recording manner. The reading operation control information is used for directing information reading means of a reproducing apparatus to read information or to stand by instead of reading the information, when reproducing information from this recording medium.

Moreover, in accordance with a further aspect of the present invention, there is provided a variable transfer rate information recording medium, on which moving picture information is recorded by changing the transfer rate and on which information representing an amount of codes generated from a portion corresponding to a unit period of time of a moving picture is also recorded in a multiplex recording manner.

Furthermore, in accordance with still another aspect of the present invention, there is provided a variable transfer rate information reproducing apparatus for reproducing moving picture information recorded on a recording medium by changing a transfer rate every predetermined period of time, which apparatus is provided with information reading means for intermittently reading information according to an amount of information necessary for decoding each predetermined period of time. When information should not be read, the information reading means ceases to read information and stands by without changing the relative speed between a reproducing head and the recording medium. Further, in case that it is not necessary to read information, the information reading means reads the read information again and thereafter discards unnecessary information.

Moreover, in accordance with yet another aspect of the present invention, there is provided a variable transfer rate information reproducing apparatus for reproducing moving picture information recorded on a recording medium by changing a transfer rate every predetermined period of time, which apparatus is provided with a decoding buffer for temporarily storing read information, buffer means for outputting an occupancy of the decoding buffer, reading controller for outputting reading control information according to the occupancy of the decoding buffer, and information reading means which occasionally does not read information but stands by according to the reading control information.

Furthermore, in accordance with another aspect of the present invention, there is provided a variable transfer rate information reproducing apparatus for reproducing information from a recording medium on which reading operation control information for controlling the information reading means to read information or stands by instead of reading information and moving picture information are recorded in a multiplex recording manner, which apparatus is provided with control information separation means for detecting the reading operation control information, and in which information reading means occasionally does not read information but stands by according to the reading operation control information.

Further, in accordance with a further aspect of the present invention, there is provided a variable transfer rate information reproducing apparatus for reproducing information from a recording medium on which information representing a transfer rate of a moving picture signal corresponding to each unit period of time and moving picture information to be recorded by changing the transfer rate thereof every unit period of time are recorded in a multiplex recording manner, which apparatus is provided with transfer rate information separation means for detecting code amount information representing a transfer rate of the moving picture signal corresponding to each unit period of time, reading operation controller for outputting control information according to the code amount information and information reading means which occasionally does not read but stands by according to the reading operation control information.

Additionally, in accordance with a still further aspect of the present invention, there is provided a variable transfer rate information reproducing apparatus for reproducing moving picture information from a recording medium on which the moving picture information is recorded as a packet of information by changing a transfer rate each unit period of time, which apparatus is provided with packet code amount detector for detecting an amount of the packet of read information, reading operation controller for outputting reading operation control information according to an amount of information corresponding to the packet and information reading means which ceases to read information and stands by according to the reading operation control information.

Further, in accordance with a yet further aspect of the present invention, there is provided a variable transfer rate information reproducing apparatus for reproducing information on a recording medium on which fixed-transfer-rate information to be recorded by fixing a transfer rate and moving picture information to be recorded by changing a transfer rate each period of predetermined length are recorded in a multiplex recording manner, which apparatus is provided with a fixed-transfer-rate detector for detecting an amount of codes generated from the information for the period of the predetermined length, information reading means for reading information recorded on the recording means and reading operation control means for controlling the information reading means in such a manner that the amount of codes generated in each period of the predetermined length becomes constant. The information reading means occasionally does not read information and stands by according to the reading control information.

As described above, on the recording medium of the present invention, what is called variable transfer rate information obtained by controlling a transfer rate every period of the predetermined length is recorded. Further, reading control information for controlling the reproducing apparatus to read information or stands by instead of reading information and information indicating an amount of codes representing the variable transfer rate information are also recorded thereon in a multiplex recording manner.

In case of the variable transfer rate information reproducing apparatus of the present invention, the variable transfer rate information recorded on the recording medium is read by the information reading means provided in the reproducing apparatus.

Incidentally, information is read by the information reading means from the recording medium at a predetermined rate (namely, information of a predetermined amount is read in a period of predetermined length).

The read information is stored in the decoding buffer. Thereafter, information of an amount necessary for decoding is outputted from this buffer. In case of decoding codes generated from fixed-transfer-rate information, the amount necessary for decoding is constant amount corresponding to a period of the predetermined length. In contrast, in case of decoding codes generated from variable transfer rate information, the amount necessary for decoding varies every period of the predetermined length.

Further, an amount of information stored in the buffer, as well as the occupancy of the buffer, changes according not only to the decoding rate (or the reading rate) but to whether information is read from the recording medium (or whether a reading operation is ceased and the apparatus stands by).

Moreover, the information reading means is controlled to read information or cease to read and stand by according to the occupancy of the buffer and the control information recorded on the recording medium in a multiplex recording manner.

As described above, the variable transfer rate information reproducing apparatus of the present invention is provided with the information reading means for intermittently reading information according to the amount of information necessary for decoding codes generated from the moving picture every period of the predetermined length. Further, this information reading means is controlled according to the occupancy of the buffer and the amount of codes generated from information in a period of the predetermined length to read information from the recording medium or to stand by without reading information. Thereby, the information recorded at variable transfer rate can be reproduced without changing the relative speed between the recording medium and the reproducing head.

Moreover, in case of the reproducing apparatus of the present invention, reading operation control information for controlling the information reading means and the information concerning the amount of codes generated in each period of the predetermined length are recorded on the recording medium in a multiplex manner and are thereafter used at the time of reproduction. This facilitates a control processing of the information reading means. Consequently, information recorded at variable transfer rate can be reproduced by utilizing a buffer of relatively small capacity and a small delay time.

As stated above, the variable transfer rate information reproducing apparatus and the recording medium used therein of the present invention have excellent effects in practical use.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 6 is a graph for showing the conversion characteristics between temporary transfer rates and target transfer rates corresponding to each unit period of time;

FIGS. 7(A) and 7(B) are diagrams for illustrating data streams (or code sequences) recorded on a recording medium;

FIG. 10 is a graph for illustrating a reading operation control effected by the first example of the variable transfer rate information reproducing apparatus of FIG. 9;

FIGS. 11(a), 11(b) and 11(c) are diagrams for showing examples of recording formats employed by a variable transfer rate information recording medium embodying the present invention;

FIG. 12 is a schematic block diagram for illustrating the configuration of a second example of a variable transfer rate information reproducing apparatus embodying the present invention;

FIGS. 15(a) and 15(b) are diagrams each for showing an example of a recording format employed by a recording medium used by the reproducing apparatus of FIG. 14;

FIG. 16 is a schematic block diagram for illustrating the configuration of a fourth example of a variable transfer rate information reproducing apparatus embodying the present invention;

DETAILED DESCRIPTION OF THE PREFERRED EMBODIMENTS

Hereinafter, preferred embodiments of the present invention will be described in detail by referring to the accompanying drawings.

Figure 4:
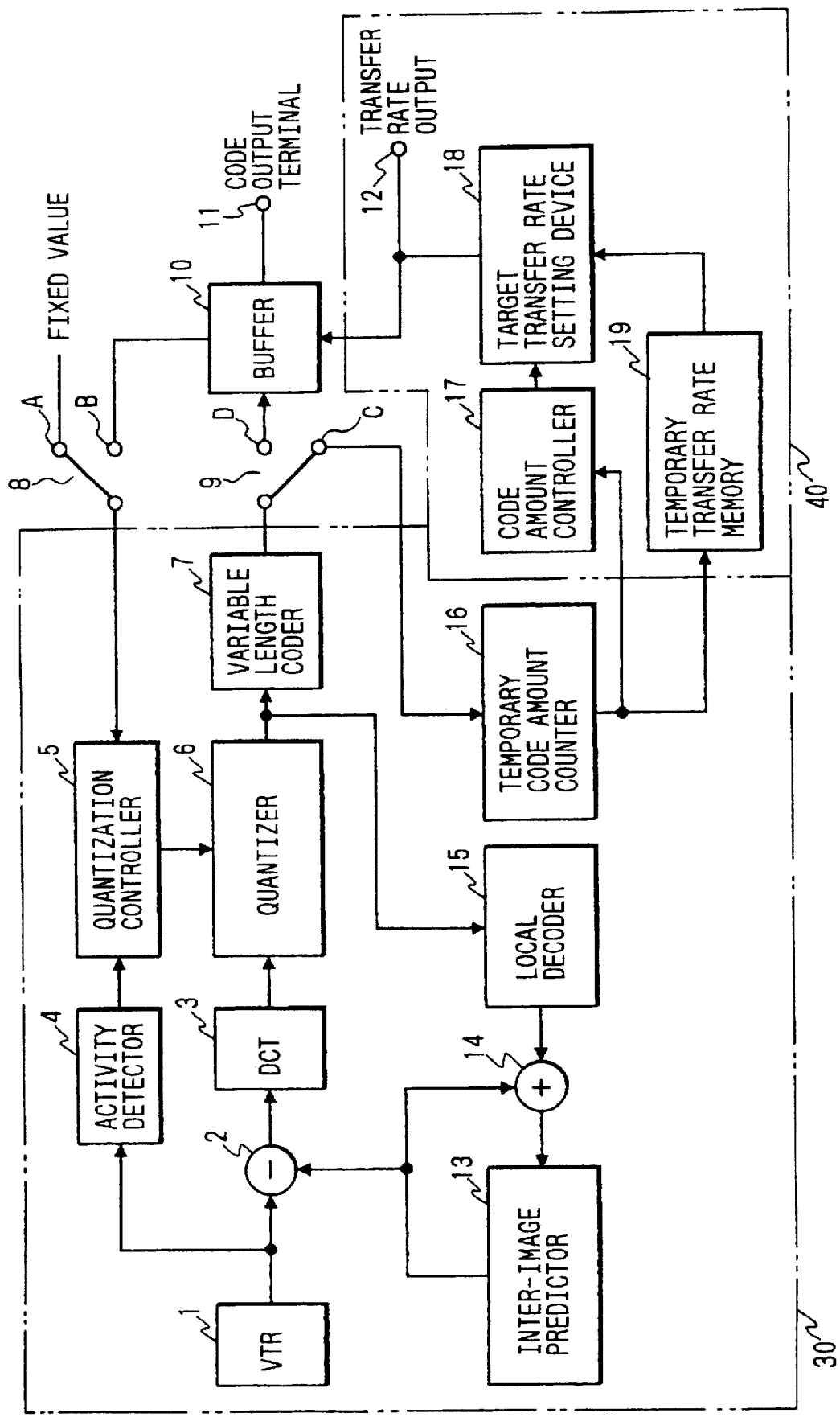
FIG. 4 is a schematic block diagram for illustrating the configuration of a variable transfer rate control coding apparatus embodying (namely, an embodiment of) the present invention.

FIG. 4 is a schematic block diagram for illustrating the configuration of a variable transfer rate control coding apparatus embodying the present invention.

Figure 1:
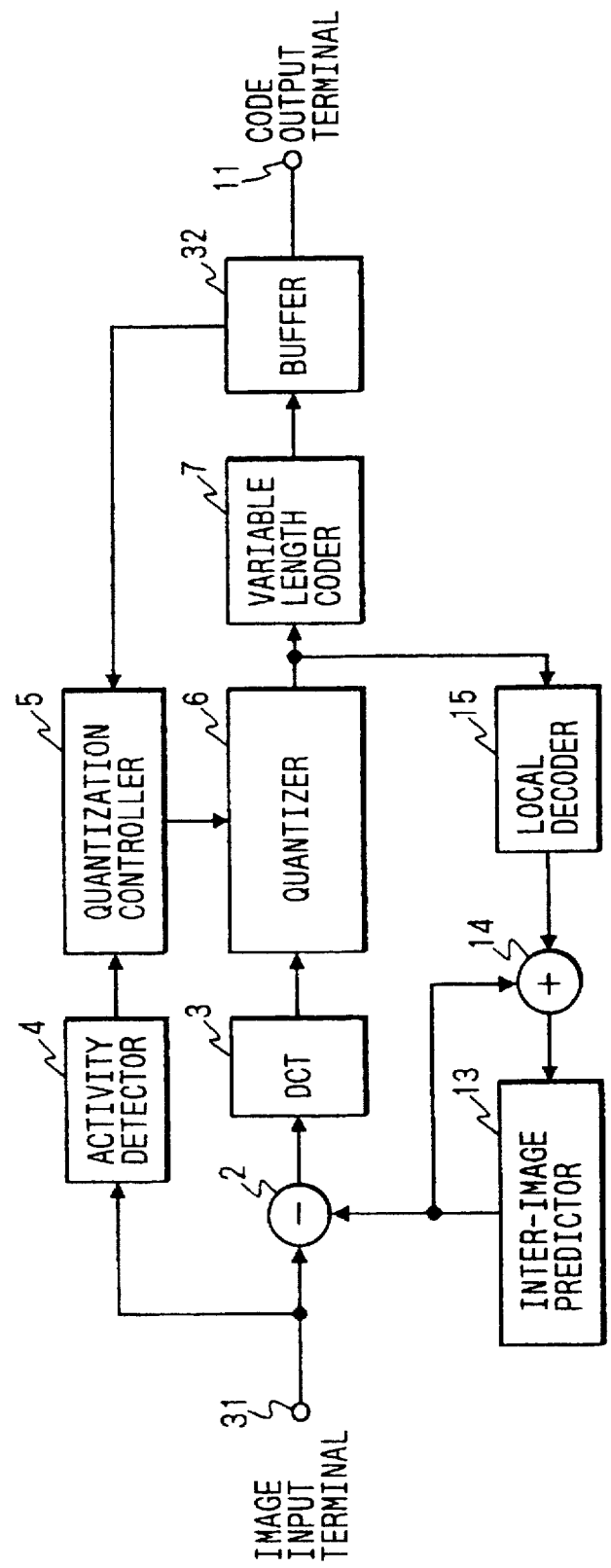
FIG. 1 is a schematic block diagram for illustrating the configuration of a conventional image coding apparatus.
Figure 2:
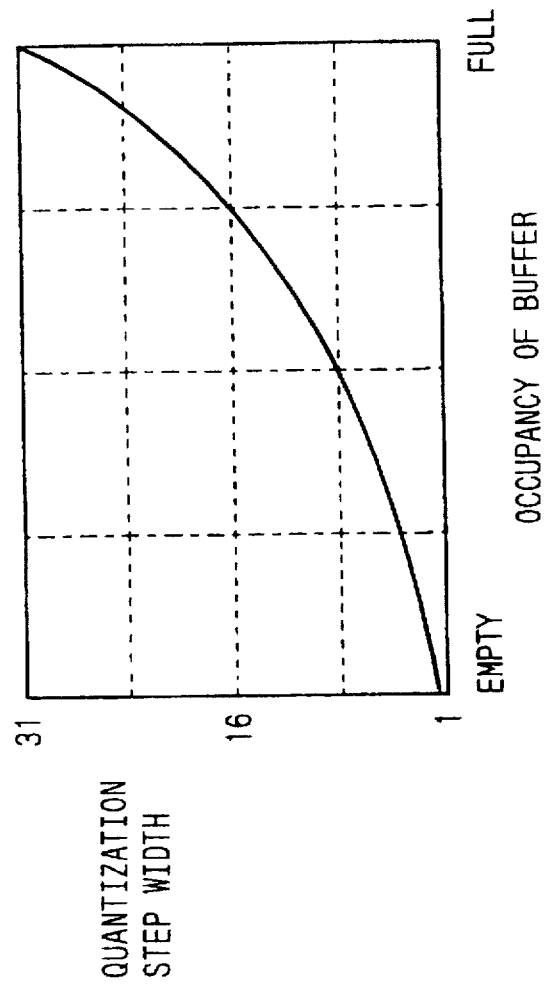
FIG. 2 is a diagram for illustrating the manner of quantization control.

In this figure, like reference characters designate like or corresponding parts of the conventional apparatus of FIG. 1.

Principal differences between the coding apparatuses of FIGS. 1 and 4 (namely, composing elements of FIG. 4 which are not contained in FIG. 1) are a VTR 1, selectors 8 and 9, a temporary code amount counter 16, a code amount controller 17, a target transfer rate setting device 18 and a temporary transfer rate memory 19.

Hereinafter, a coding performed in this variable transfer rate control coding apparatus will be described in detail by referring to FIG. 4.

A coding is performed on a same moving picture signal two times. At first time, a coding process is performed for effecting a temporary coding for setting a target transfer rate corresponding to each unit period of time. At second time, another coding process is performed for effecting an actual coding (or a real coding). Therefore, in case of a coding apparatus which performs a coding at the same speed as the running speed of a moving picture, the processing time required for performing the coding process twice is nearly two times the running time of the moving picture.

A method for fixing a total amount of codes to a constant value and distributing the amounts of codes by performing such a feed forward processing has been proposed by the inventor of the present invention. Basic ideas employed in this method are described in previous Japanese Patent Applications (see, for example, the Japanese Unexamined Patent Publication (Kokai Tokkyo Koho) Official Gazette Nos. S63-151225, H2-194734 and H3-263927).

An object to be processed by the apparatus of the present invention is a moving picture signal. Further, the activity is not used as an estimate of an amount of codes. Moreover, the apparatus of the present invention performs a coding, which is the same as a real coding, and uses an output coded by a variable length coding. In contrast, in cases of the apparatuses of the previous applications, a unit period (hereunder sometimes referred to as a target-transfer-rate setting unit period), to which a target transfer rate is set correspondingly, is equal to a unit period (hereunder sometimes referred to as a control-operation unit period), to which a control operation is effected correspondingly. However, in case of the apparatus of the present invention, a target-transfer-rate setting unit is equal to a predetermined unit period of time and a control operation unit period is less than the predetermined unit period of time. Further, a target transfer rate is set in such a manner to become less than a corresponding temporary transfer rate and to be less than a predetermined upper limit as will be described.

When performing a temporary coding, quantization control is not performed according to the occupancy of a buffer. Instead, a transfer rate corresponding to each unit period of time is fixed to a predetermined value and then a temporary amount of codes corresponding to each unit period of time (namely, a temporary transfer rate) is obtained. Upon completion of this processing, the conversion characteristics between the temporary transfer rate and the corresponding target transfer rate are determined from the total amount of codes and the capacity of the recording medium correspondingly to each unit period of time.

When performing an actual coding (namely, a real coding), the target transfer rate is established from the corresponding temporary transfer rate and the conversion characteristics every unit period of time. Moreover, the real coding is controlled according to the occupancy of the buffer and the target transfer rates. Incidentally, the target transfer rate is set in such a fashion that moving picture signals to be recorded are just stored in the recordable area of the recording medium. Thus, so long as the buffer does not overflow, the total amount of codes obtained as the result becomes adapted to the recording medium.

At least, during each unit period of time, the transfer rate is not changed and is kept constant. Usually, a buffer 10 has capacity corresponding to an amount of codes generated in a period of 0.2 to 0.3 second. Further, instantaneous change in amount of codes is absorbed by the buffer 10. Thus, the unit period of time is set to be a little longer than the length of a short period in which the change in amount of codes occurs. Namely, it is preferable that the unit period of time is set as adapted to change of a long period. For example, the unit period of time is set to be 0.5 to 1.0 second.

Incidentally, in cases of the apparatuses of the previous applications, simple activity is used when estimating an amount of codes. In contrast, in case of this embodiment, a nearly same coding is performed two times. Thus, there is no necessity of simplifying a coding process. Therefore, similarly as in case of the real coding, a variable length coding is performed as the temporary coding. Consequently, an exact amount of generated codes can be obtained from an output signal representing a result of the coding.

Conversely, there has been proposed a method of using a plurality of quantizers and variable length coders and estimating an amount of codes by effecting different types of quantization. In case of this method, what is called cyclic prediction is employed for performing a coding. Thus, differences in quantization influence a result of the prediction. Consequently, a precise amount of codes can not be obtained if a plurality of quantizers and a plurality of variable length coders are not provided for the inter-image prediction or the like.

Next, a temporary coding means 30 of this embodiment will be described in detail hereinbelow. The temporary coding means 30 is used to obtain the temporary transfer rate for transferring the moving picture signal.

As shown in FIG. 4, an image signal outputted from the VTR 1 is inputted to the prediction subtracter 2 and the activity detector 4. In case of this embodiment, the same image signal is supplied to a coding portion two times. Therefore, all image signals before coded are recorded on a mass image recording medium such as VTR. For instance, a memory element, an optical disk and a hard disk drive (HDD) which have sufficient capacity may be employed as the mass image recording medium.

In case of the apparatus of FIG. 4, a basic coding process is similarly to that of the conventional apparatus. First, a prediction signal supplied from the inter-image predictor 13 is subtracted by the prediction subtracter 2 from the image signal outputted from the VTR 1. Then, a signal representing a result of this subtraction (namely, a predictive residual) is inputted to the DCT device 3. Thereafter, a DCT operation and a quantization operation are effected by the DCT device 3 and the quantizer 6, respectively. Subsequently, this quantized signal is inputted to the variable length coder 7 and the local decoder 15. Information represented by the quantized signal is converted by the variable length coder 7 into a compressed code. This compressed code is then inputted to the selector 9.

At that time, an input to the selector 8 is switched to a terminal A through which a predetermined fixed value is inputted to the quantization controller 5 as the occupancy of the buffer. Thus the quantization is changed only by the activity corresponding to each block, which is inputted from the activity detector 4 to the quantization controller 5. Incidentally, the fixed value is set in such a way that the image coded by using this fixed value has sufficient picture quality.

On the other hand, in the local decoder 15, the code is decoded to produce a reproduced prediction residual signal. This reproduced prediction residual signal is then inputted to the adder 14 whereupon the prediction signal inputted from the inter-image predictor 13 is added to the reproduced prediction residual signal. Then, a reproduced image signal representing a result of this addition is inputted to the inter-image predictor 13 whereupon an inter-frame prediction signal is generated from the reproduced image signal. Subsequently, the inter-frame prediction signal is supplied to the prediction subtracter 2 and the adder 14.

In case of the apparatus of FIG. 4, at the time of the first coding, an output of the variable length coder 7 is inputted to the temporary code amount counter 16 through the selector 9. Further, an amount of codes generated in each unit period of time is counted by the temporary code amount counter 16 and a signal representing the count (namely, the amount of codes generated in each unit period of time) is then outputted therefrom.

Next, a target transfer rate setting means 40 will be described in detail hereinbelow. This target transfer rate setting means 40 is used to set a target transfer rate from the temporary amount of codes each unit period of time in such a manner that a total of amounts of codes generated from the moving picture signals becomes a predetermined value.

The temporary transfer rate outputted from the temporary code amount counter 16 is inputted to the code amount controller 17 and the temporary transfer rate memory 19. In the temporary transfer rate memory 19, all of the transfer rates respectively corresponding to unit periods of time, which are used again in the actual coding (real coding), are stored.

For instance, in case where a moving picture, the running time of which is 1 hour, is represented by a set of data corresponding to 1 second, the amount or number of data to be stored is 3600. The code amount controller 17, whose configuration is shown in FIG. 5, is used to determine the conversion characteristics between the temporary transfer rates and the target transfer rates.

Figure 5:
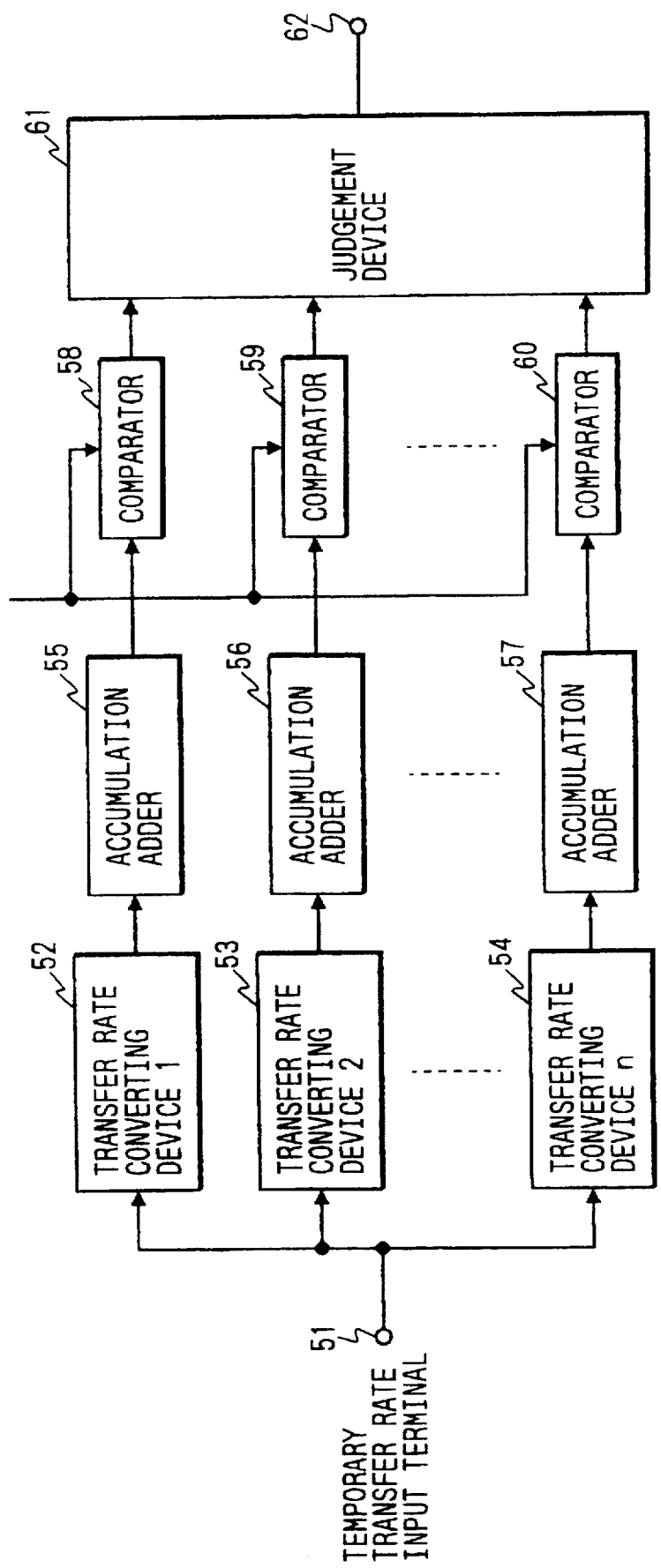
FIG. 5 is a schematic block diagram for illustrating the configuration of a code amount controller of the embodiment of the present invention.

FIG. 5 is a schematic block diagram for illustrating the configuration of the code amount controller 17 of this embodiment.

As shown in this figure, the temporary transfer rate inputted from the temporary transfer rate input terminal 51 is converted by n transfer rate converting devices (hereunder sometimes referred to simply as converters) 52, 53, 54, . . . whose conversion characteristics are different from one another. Thereafter, the transfer rates respectively corresponding to the conversion characteristics are accumulated by the accumulation adders 55, 56, . . . 57 over the entire running time of the moving picture. Thus the total amount of codes, which are generated from the entire picture and correspond to each of the converters, is obtained.

Upon completion of the temporary coding, the total amounts of codes corresponding to the transfer rate converting devices (or converters) are inputted to comparators 58, 59, . . . 60, respectively, whereupon the inputted total amounts of codes are target total amounts of codes set from the recordable capacity of the recording medium. Then, outputs of the comparators are inputted to a judgment device 61 for making comparisons between each pair of the outputs of the comparators. The judgement device 61 determines and selects the conversion characteristic corresponding to the total amount of codes which is less than the target total amount of codes but is greater than any of the total amounts of codes corresponding to the other conversion characteristics. Then, information representing the selected conversion characteristic is inputted from the conversion characteristic information output terminal 62 to the target transfer rate setting device 18 of FIG. 4. FIG. 6 shows the conversion characteristics corresponding to the converters 1 to n.

Namely, FIG. 6 is a graph for showing the conversion characteristics between the temporary transfer rates and the target transfer rates corresponding to each unit period of time. As shown in this figure, the upper limit (Rmax) to the outputs of the transfer rate converting devices is first determined. This is due to the facts that there is an upper limit to the processing abilities (or throughputs) of the recording medium and the decoder and that the maximum transfer rate is determined according to this upper limit to the throughputs. Therefore, although the variable transfer rates are employed, the maximum target transfer rate is a fixed value.

As shown in this figure, for example, logarithmic characteristics are employed as the conversion characteristics, by which change in each target transfer rate is compressed or suppressed throughout in comparison with change in each temporary transfer rate, corresponding to the transfer rate converting devices. Namely, each target transfer rate is controlled as gently increases. In case of a portion of the picture, which portion corresponds to a small temporary amount of codes corresponding to each unit period of time, degradation in visual picture quality is conspicuous. Therefore, the amount of codes is somewhat increased.

The conversion characteristics between the temporary transfer rate X and the target transfer rate R are given by, for instance, the following equations:

$$R = K * LOG(Y*X);$$

or $$R = K * X^Z$$

where K and Y are positive numbers and Z is a positive number less than 1. The conversion characteristics can be changed by changing the values of Y and Z.

Namely, when the target transfer rate corresponding to each unit period of time is obtained by converting the temporary transfer rate corresponding to each unit period of time, the conversion is effected by making a ratio of increase in the target transfer rate to corresponding increase in the temporary transfer rate less than 1 and limiting the maximum value of the target transfer rate to a constant value.

The larger the number n of kinds of the conversion characteristics becomes, the more precise the selected conversion characteristics become. Thus, waste in capacity of the recording medium becomes smaller.

Incidentally, in case of the code amount controller 17 of FIG. 5, the transfer rate converting devices, the accumulation adders and the comparators are placed in parallel with one another as illustrated in this figure and operate in parallel with the temporary coding. However, the apparatus may employ a serial processing instead of such a parallel processing.

In case of employing a serial processing, the code amount controller has only one transfer rate converting device, one accumulation adder and one comparator, which are as illustrated in FIG. 5. In this case, after the temporary coding is finished and before the real coding is performed, the total amounts of codes corresponding to various conversion characteristics are calculated from the data stored in the temporary transfer rate memory 19. As a consequence, a conversion characteristic most suitable for calculating the target transfer rate is selected. Further, information representing the selected conversion characteristic is outputted. Such a serial processing is described in, for example, the Japanese Unexamined Patent Publication (Tokkyo Kokai Koho) Official Gazette No. H2-417572.

Next, the coding means for performing an actual coding (namely, a real coding) will be described in detail hereinbelow. This coding means is used to perform a coding by controlling an amount of codes in accordance with the target transfer rate corresponding to a unit period of time.

In case of the apparatus of FIG. 4, the same image signal as used in the temporary coding is outputted from the VTR 1. Then, a coding similar to the temporary coding is performed. Basically, manners of operations of the prediction subtracter 2, the DCT device 3, the activity detector 4, the quantization controller 5, the quantizer 6, the variable length coder 7, the inter-image predictor 13, the adder 14 and the local decoder 15 are similar to those of the operations of the corresponding elements in case of performing the temporary coding. However, the contents of the operations of these elements in case of performing the real coding are different from those of the operations of these elements in case of performing the temporary coding.

When performing the real coding, an output of the variable length coder 7 is applied to the buffer 10 through the selector 9. Further, variation in amount of generated codes, which variation is of a short period, is absorbed by the buffer 10. Codes are outputted from the buffer 10 through the code output terminal 11 to the decoder.

Furthermore, a reading rate for reading a code from the buffer 10 is controlled by a value supplied from the target transfer rate setting device 18 every unit period time. Thus, the amount of codes outputted from the buffer 10 changes each unit period of time. In the target transfer rate setting device 18, the temporary transfer rate inputted from the temporary transfer rate memory 19 every unit period of time is converted according to the conversion characteristics inputted from the code amount controller 17 and thus the target transfer rate is established.

On the other hand, information representing the occupancy of the buffer 10 is inputted to the quantization controller 5 through the selector 8.

Further, the quantization step width is controlled by the quantization controller 5 according to the activity and the filling rate of the buffer. In case of such control, differently from the conventional apparatus, variation in amount of generated codes, which variation is of a long period, is absorbed by utilizing a variable transfer rate every unit period of time. Thus only local variation thereof is absorbed. Consequently, the possibility of an occurrence of an overflow becomes low.

Incidentally, in case where there is no need of utilizing a fixed transfer rate for an output of the buffer, the buffer is treated as a virtual one and thus an output of the variable length coder 7 is directly outputted.

Next, it will be described hereinbelow by referring to FIGS. 7(A) and 7(B) how data streams coded by the coding apparatus are recorded by the apparatus of the present invention and the conventional apparatus.

FIGS. 7(A) and 7(B) are diagrams for illustrating the data streams (or code sequences) recorded on the recording medium.

In these figures, numerals designate numbers of unit periods of time. Practically, there are unit periods, the number of which is far larger than the number of unit periods illustrated in these figures. In case of the conventional apparatus, when the data stream is recorded on the recording medium, the amount of data of a portion of the data stream corresponding to a unit period is constant as illustrated in FIG. 7(A). As the result, an open space is generated in the recording medium. In contrast, in case of the embodiment of the present invention, the amount of codes of the data stream changes every unit period of time as illustrated in FIG. 7(B). Moreover, no space occurs in the recording medium because the total amount of codes is controlled.

Next, a variable transfer rate decoding apparatus of the present invention will be described hereinbelow by referring to FIG. 8.

Figure 8:
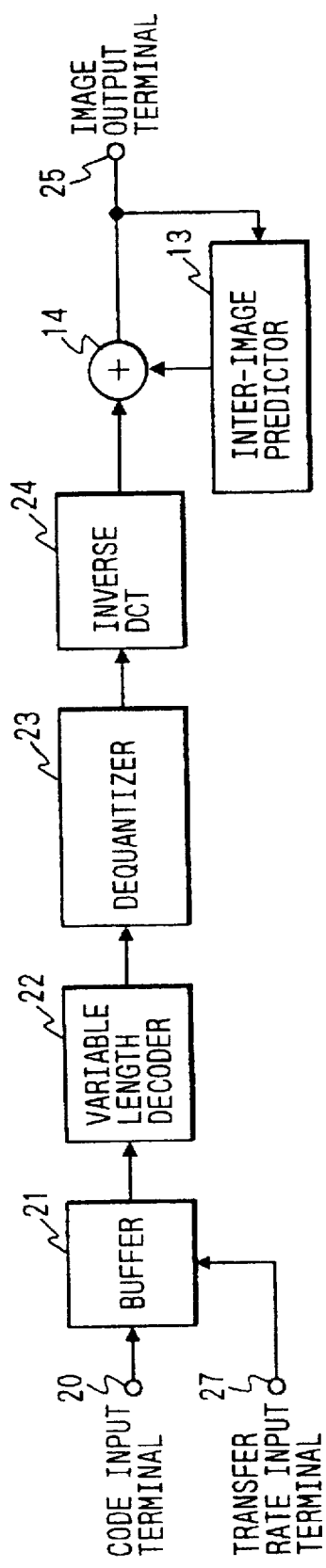
FIG. 8 is a schematic block diagram for illustrating the configuration of a variable transfer rate decoding apparatus embodying the present invention for decoding codes generated by the variable transfer rate control coding apparatus of FIG. 4.

FIG. 8 is a schematic block diagram for illustrating the configuration of the variable transfer rate decoding apparatus of the present invention for decoding codes generated by the variable transfer rate control coding apparatus of FIG. 4.

Figure 3:
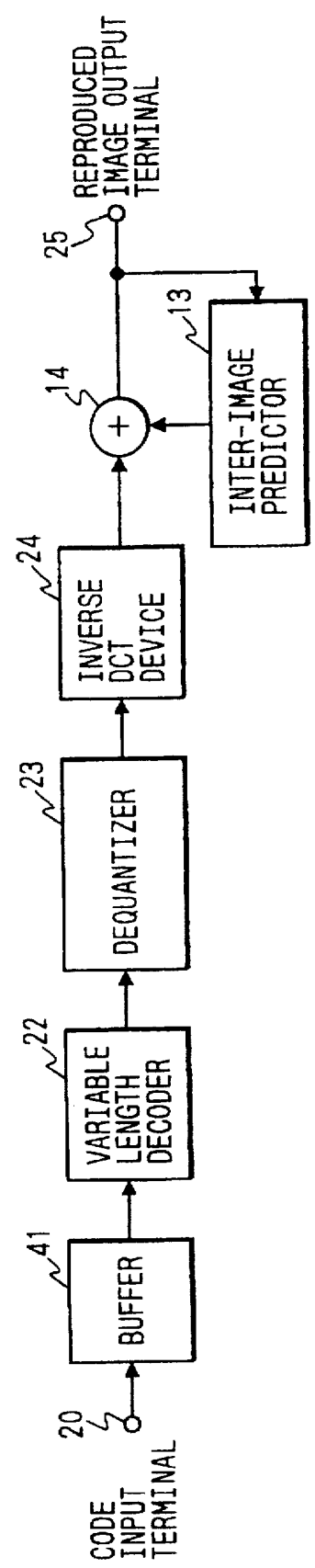
FIG. 3 is a schematic block diagram for illustrating the configuration of a conventional decoding apparatus.

In this figure, like reference characters designate like or corresponding elements (namely, elements having the same functions) of the conventional apparatus of FIG. 3. The decoding apparatus of FIG. 8 is different from the conventional decoding apparatus of FIG. 3 in that the transfer rate is inputted to the buffer 21.

The codes inputted from the code input terminal 20 are outputted from the buffer 21 to the variable length decoder 22 in synchronization with the operation performed in the device 22. Further, a speed of writing the transfer rate to the buffer 21 is controlled according to rate information inputted from the transfer rate input terminal 27 every unit period of time in such a manner to be adapted to the transfer rate of the inputted code.

Figure 9:
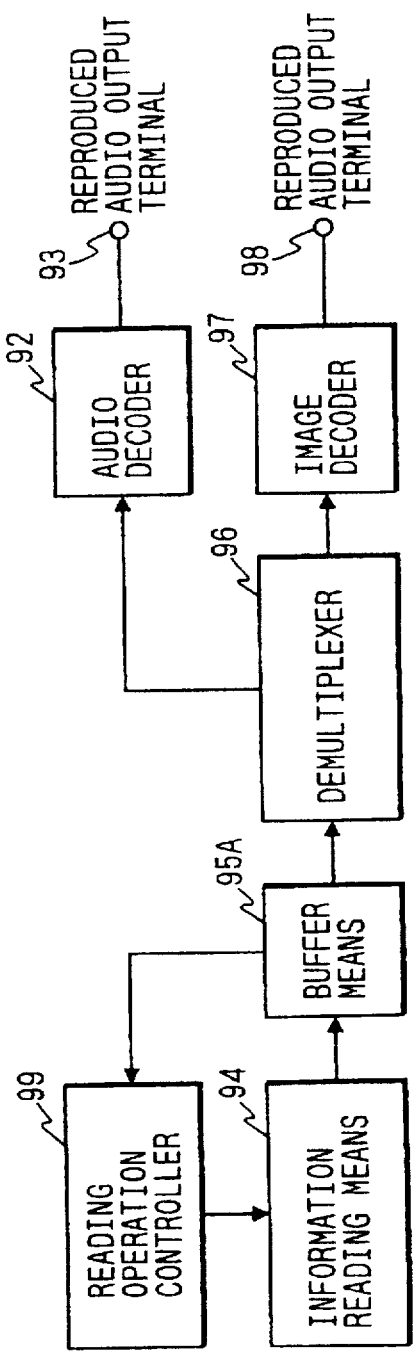
FIG. 9 is a schematic block diagram for illustrating the configuration of a first example of a variable transfer rate information reproducing apparatus embodying the present invention.

Turning to FIG. 9, there is shown a schematic block diagram for illustrating the configuration of a first example of a variable transfer rate information reproducing apparatus embodying the present invention.

In case of the apparatus of this figure, information recorded at a variable transfer rate is read intermittently by an information reading means 94 from the recording medium and subsequently is inputted to buffer means 95A having a decoding buffer for decoding. Further, information outputted intermittently from information reading means 94 is Moreover, the buffer means 95A. Moreover, the information is outputted therefrom to a demultiplexer 96 when the information is necessary for decoding.

In the demultiplexer 96, audio information and image information are separated. Then, the audio information and the image information are inputted to an audio decoder 92 and an image decoder 97, respectively. Further, the audio information and the image information are decoded by the audio decoder 92 and the image decoder 97, respectively. Moreover, a reproduced audio and a reproduced image are outputted from a reproduced audio output terminal 93 and a reproduced image output terminal 98.

On the other hand, information representing the occupancy of the buffer, which information is outputted from the buffer means 95A, is fed to a reading operation controller 99. At that time, the buffer means 95A becomes almost empty when an amount of written information is small in comparison with an amount of information required for decoding. Further, the buffer means 95A becomes nearly full of information when an amount of information written thereto is larger than an amount of information used for decoding.

Then, reading operation control information is outputted from the reading operation controller 99 to the information reading means 94 according to the state of the buffer means 95A. Namely, when the buffer of the buffer means 95A is nearly empty, reading operation control information is outputted to initiate a reading operation or to continue to perform a reading operation. Further, when the buffer is nearly full of information, the reading operation control information is outputted to control the information reading means to cease a reading operation and stand by.

Next, a method for controlling the information reading means 94 will be described concretely hereinbelow.

A reading of information by the information reading means 94 from the recording medium is performed by using, for example, a period of one revolution of a disk as a unit period of time.

Further, even in case where information is not read by the information reading means 94 from the recording medium at present time and on the other hand, information is read from the buffer means at the maximum rate for decoding, a reading operation of the information reading means 94 is controlled in such a way that the buffer of the buffer means does not become empty until the next reading operation is started.

For example, in case where an amount of codes read from the recording medium during a period of the predetermined length (hereunder sometimes referred to as a reading rate) is equal to a maximum amount of codes required for decoding during a period of the predetermined length (hereunder sometimes referred to as a decoding rate), the buffer of the buffer means 95A needs capacity which is a little larger than an amount of information read two times. Further, the information reading means 94 is controlled in such a manner that if a recording area, on which information left in the buffer is recorded, is less than half of the recordable area of the buffer, the reading operation is kept performed and that if the recording area, on which information left in the buffer is recorded, is equal to or greater than half of the recordable area of the buffer, the reading operation is ceased and the information reading means stands by.

A more practical manner of such control is illustrated in FIG. 10.

FIG. 10 is a graph for illustrating a manner of such reading control and illustrates the relation among the decoding rate, the reading rate and the occupancy of the buffer.

As illustrated in this figure, the decoding rate varies every predetermined period Td. Further, information is read from the recording medium intermittently at a predetermined reading rate. It is controlled every predetermined period Tr whether or not a reading of information is performed.

In a period between the moments t13 and t14, the decoding rate has a maximum value Rmax. Further, the value of the reading rate is Rmax. Thus, during this period, the occupancy of the buffer does not change.

In contrast, in a period between the moments t1 and t2, the reading rate is greater than the decoding rate. Thus, during this period, the occupancy of the buffer increases. At a moment t2 at which a period of time Tr has passed since a reading operation is commenced at the moment t1, the occupancy of the buffer is larger than a level indicated by the dashed central line K (namely, half of the capacity of the buffer). Thus, the reading operation is stopped. After the moment t2, the occupancy of the buffer decreases and becomes equal to the level indicated by the central line K at a moment t3.

At a moment t4 when a period 2Tr has passed since the moment t2 at which the reading operation is ceased at the precedent time, the occupancy of the buffer is less than ½. Thus, the reading operation is resumed.

In case of this example, the moment when the decoding rate changes is synchronized with the moment at which the reading operation is commenced or ceased as illustrated in this figure. However, it is not necessary to synchronize former moment with the latter moment.

Further, the information reading means 94 of FIG. 9 performs an information reading operation in accordance with the reading operation control information sent from the reading operation controller 99. However, a practical method for controlling the information reading means to keep reading information from the recording medium or to cease reading such information and stand by varies with the kind of the recording medium employed.

In case of employing a disk medium, the practical method for controlling the reading operation varies with the manner of controlling a tracking of a reproducing head. For example, in case of employing what is called a disk of the spiral type in which information track is continuous, a usual reading operation is continuously performed when an information reading operation is kept performed. In contrast, when the information reading operation should be stopped and the apparatus should stand by, the reproducing head is skipped to the precedent track and a tracing is repeatedly performed on the track corresponding to an already read part of information. Thus the apparatus falls into a stand-by state.

In contrast with this, in case of employing what is called a disk of the concentric circle type in which information track is closed like a circle, the apparatus falls into a stand-by state by repeatedly performing a tracing on the track corresponding to am already read part of information. Then, the reproducing head is skipped to the subsequent track to read information recorded on the next track.

Meanwhile, in case of a VTR having what is called a rotary drum, information tracks are distributed discontinuously on tape. Thus, after information is once read from the track, the tape or reproducing head is moved. Further, a tracing is repeatedly performed on the portion which has been already read. Thus the apparatus is put into a stand-by state. Moreover, the reproducing head or the tape is shifted in such a manner that the reproducing head is set on the subsequent track. Thus information recorded on the next track is read.

Information recorded on the recording medium at a variable transfer rate can be realized by controlling the information reading means to keep reading information or stand by without changing the number of revolutions of the disk or drum, namely, without changing the relative speed between the reproducing head and the recording medium as described above.

Further, in the stand-by state, the reproducing head may repeatedly read information recorded on the same track and outputs the read information. Further, unnecessary information may be discarded later. In this case, information is read in a narrow sense. However, substantially, information to be read is not read. In the following description, the expression "does not read and stands by" means "does not read substantially and stands by", precisely speaking.

FIGS. 11(a), 11(b) and 11(c) are diagrams for showing examples of recording formats employed by a variable transfer rate information recording medium according to the present invention.

The formats of FIGS. 11(a), 11(b) and 11(c) are the recording formats to be used for recording information on the variable transfer rate information recording medium of the present invention (incidentally, the recording formats to be used for the recording medium of the compact disk read-only memory (CD-ROM) type are shown in these figures).

In these cases, the recording area of the recording medium is partitioned into sectors having a predetermined number of bytes as illustrated in FIG. 11(a). Each sector consists of a sector header area, on which management information concerning synchronization signals and sector addresses is recorded, and a data area, on which image information and audio information are recorded.

In case that data (or information) recorded on the data area of FIG. 11(a) are read from the recording medium in succession. The read data are an audio header, audio data, image header and image data which are recorded in this order as illustrated in FIG. 11(b). Further, as illustrated in FIG. 11(c), a synchronization code is recorded on a leading address of each of the headers.

FIG. 12 is a schematic block diagram for illustrating the configuration of a second example of a variable transfer rate information reproducing apparatus according to the present invention.

In this figure, same reference characters designate same or corresponding elements (namely, elements having the same functions) of the apparatus of FIG. 9. For simplicity of description, the explanation of these elements is omitted herein.

Differently from the apparatus of FIG. 9, the apparatus of FIG. 12 does not have the reading controller 9 but is provided with control information separation device 121. In case of this example, reading operation control information used for controlling information reading means is preliminarily set in an encoder (namely, the coding apparatus). Further, the reading operation control information is preliminarily recorded on the recording medium in a multiplex recording manner.

In case of the apparatus of FIG. 12, information read from the recording medium by information reading means 94 is inputted to buffer means 95 and control information separation device 121.

Operations of the demultiplexer 96, the audio decoder 92 and the image decoder 97, which follow the buffer means 95, are similar to those of the same elements of the first example of FIG. 9. Thus reproduced audio and image, which are decoded, are outputted from the reproduced audio output terminal 93 and the reproduced image output terminal 98, respectively.

On the other hand, the control information separation device 121 detects the synchronization code from an output of the information reading means 94 and separates the reading operation control information. The separated information is inputted to the information reading means 94 therefrom. In the information reading means 94, it is determined according to the reading operation control information whether the means 94 keeps reading information from the recording medium or stands by.

In this way, the reading operation control information is recorded on the recording medium in a multiplex recording manner. When reproducing the recorded information, the information reading means 94 is controlled according to the reading operation control information. This is rational and results in that the processing can be easily performed in the decoder or decoding apparatus. However, the delay time or the like of the control processing effected in the information reading means should be definite.

Incidentally, the control information is recorded in the sector header or the audio and image headers of the recording medium. Incidentally, in the recording medium, a control header and a control information area may be provided for recording the control information.

Figure 13:
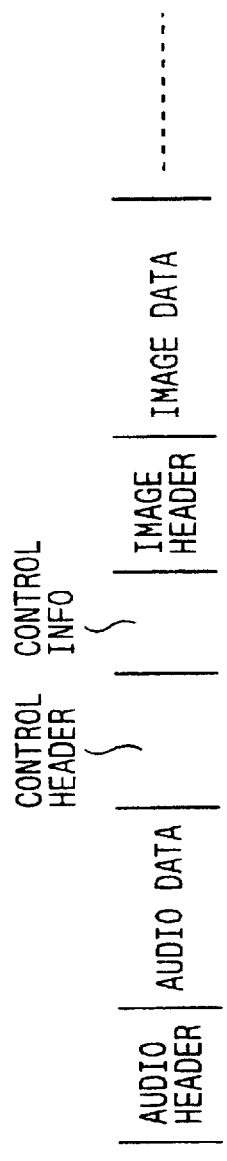
FIG. 13 is a diagram for showing an example of a recording format employed by a recording medium used by the reproducing apparatus of FIG. 12.

FIG. 13 is a diagram for showing an example of the recording format employed by the recording medium used by the reproducing apparatus of FIG. 12.

Figure 14:
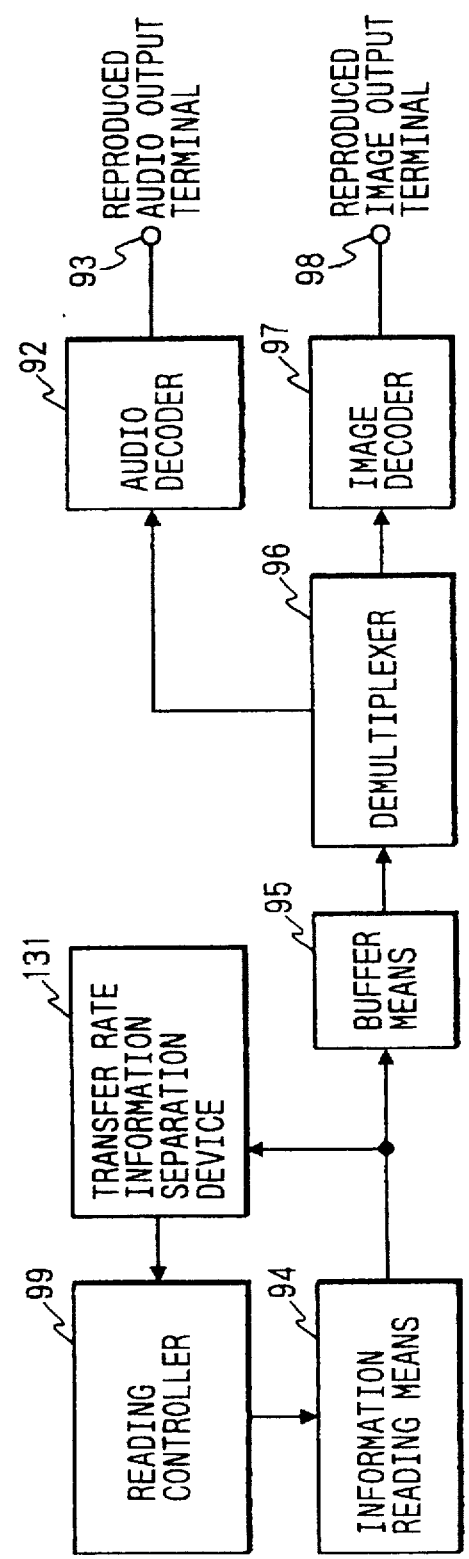
FIG. 14 is a schematic block diagram for illustrating the configuration of a third example of a variable transfer rate information reproducing apparatus embodying the present invention.

FIG. 14 is a schematic block diagram for illustrating the configuration of a third example of the variable transfer rate information reproducing apparatus according to the present invention.

In this figure, same reference characters designate same or corresponding composing elements (namely, elements having the same functions) of the apparatus of FIG. 9. For simplicity of description, the explanation of these composing elements is omitted herein.

The apparatus of FIG. 14 is different from the apparatus of FIG. 9 in that the former apparatus is provided with a transfer rate separation device 131.

Information read from the recording medium and outputted by the information reading means 94 is inputted to the buffer means 95 and control information separation device 131. Operations of the composing elements following the buffer means 95 are similar to those of the same or corresponding elements of the second example of FIG. 12.

FIGS. 15(a) and 15(b) are diagrams each for showing an example of the recording format employed by the recording medium used by the reproducing apparatus of FIG. 14.

In case of the apparatus of FIG. 14, an information signal of the format of FIG. 15(a) is outputted from the information reading means 94. Further, in the transfer rate separation device 131, the synchronization code corresponding to code amount information is detected from the audio header and the image header. Then, amounts of codes B1 and B2 corresponding to a period of the predetermined length, which are recorded in these headers, respectively, are separated. Thus, the decoding rate (namely, the transfer rate) corresponding to the period of the predetermined length is calculated, and the calculated decoding rate is inputted to the reading operation controller 99.

As is seen from FIG. 15(a), the code amount information represents an amount of codes (namely, decoding rate (or transfer rate)) required for decoding of the recorded information following this code amount information and corresponding to the period of the predetermined length the audio code amount B1 and the image code amount B2 required for performing a decoding every 100 milli-seconds (ms) (corresponding to 3 frames in case of an NTSC (National Television System Committee) television are recorded on both of the headers.

Further, the code amount information may be recorded by using the format of FIG. 15(b). Namely, an audio header, audio data, an image header and image data are recorded as a packet of information. Further, a total value B1 of an audio code amount and an image code amount to be decoded in a period of, for instance, 100 ms is recorded in a packet header.

In case of the apparatus of FIG. 14, the information reading means 94 is controlled by the reading operation controller 99. Thus the code amount to be read by the information reading means 94 is preliminarily known. On the other hand, information representing an amount of codes needed for performing a decoding is supplied from the transfer rate information separation device 131.

Thus, the future occupancy of the buffer means 95 can be predicted by the reading operation controller 99 from an output of the reading operation controller 99 and an output of the transfer rate information separation device 131. A control signal is supplied to the information reading means 94 to prevent occurrences of an overflow and an underflow in the buffer means 95.

Namely, let Tr denote a unit period of time for performing a reading operation by the information reading means 94 (see FIG. 10). The predicted occupancy of the buffer means 95 at a moment when the period Tr has passed since the present moment is calculated corresponding to each of the cases that the reading operation is performed and that the reading operation is not performed. The reading means 94 is controlled in such a manner that the predicted occupancy is in the vicinity of the central line K of FIG. 10.

As can be seen from a comparison between the first example of FIG. 9 and this example, in case of this example, the information reading means 94 can be controlled faster and the necessary capacity of the buffer can be reduced because an amount of codes read from the buffer is known preliminarily.

Moreover, as can be seen from a comparison between the second example of FIG. 10 and this example, in case of this example, the processing to be performed in the decoder becomes somewhat complex but the information reading means 94 can be controlled in such a manner to be fit for the throughput thereof.

FIG. 16 is a schematic block diagram for illustrating the configuration of a fourth example of a variable transfer rate information reproducing apparatus according to the present invention.

In this figure, same reference characters designate same or corresponding composing elements (namely, elements having the same functions) of the apparatus of FIG. 9. For simplicity of description, the explanation of these composing elements is omitted herein.

The example of FIG. 16 is different from the third example of FIG. 14 in that the former example is provided with a packet code amount detector 141 instead of the transfer rate separation device 131. Operations of the composing elements other than the packet code amount detector 141 are similar to those of the same or corresponding elements of the third example of FIG. 14.

In the packet code amount detector 141, a synchronization signal corresponding to a packet is detected from an output of the information reading means 94 and further an amount of codes of this packet is measured until a synchronization signal corresponding to the next packet is detected. In this way, an amount of codes of one packet is obtained and is inputted to the reading operation controller 99. The format of this packet is similar to that of, for instance, FIG. 15(b). However, it is not necessary to record the amount of information of a packet in the packet header.

Further, such a packet is established each period of the predetermined length (for example, 100 ms) required for a decoding. Thus an amount of codes of one packet is variable.

In case of the example of FIG. 16, the information reading means 94 is controlled by the reading operation controller 99. Thus the code amount to be read by the information reading means 94 is preliminarily known. On the other hand, information representing an amount of codes needed for performing a decoding is supplied from the packet code amount detector 141.

Thus, the reading operation controller 99 is controlled according to an output of the reading operation controller 99 and an output of the packet code amount detector 141, similarly as in case of the third example of FIG. 14.

As described above, in case of the third example, an amount of information to be read is preliminarily known before a reading operation is performed. In contrast, in case of the fourth example, the result of the measurement effected by the packet code amount detector 141 represents an amount of codes concerning information already read. Thereby, the response to the control is a little slower than that in case of the third example. However, an amount of codes required for decoding is known in a stage precedent to the buffer means 95. Therefore, the response is faster than that in case of the first example in which the information reading means is controlled according to the occupancy of the buffer.

Figure 17:
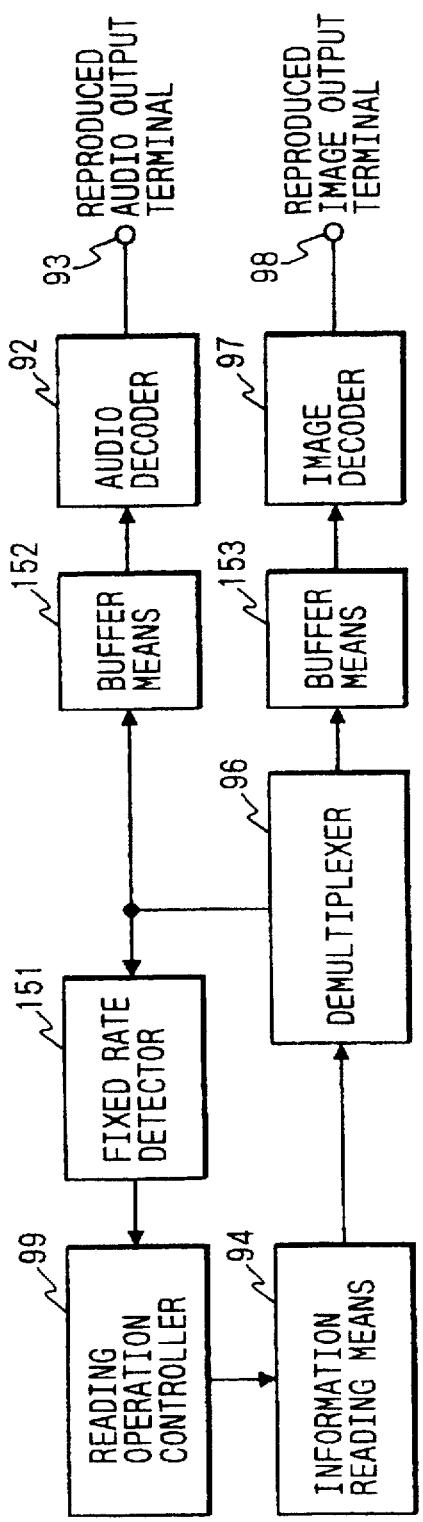
FIG. 17 is a schematic block diagram for illustrating the configuration of a fifth example of a variable transfer rate information reproducing apparatus embodying the present invention.

FIG. 17 is a schematic block diagram for illustrating the configuration of the fifth example of the variable transfer rate information reproducing apparatus according to the present invention.

In this figure, same reference characters designate same or corresponding composing elements (namely, elements having the same functions) of the apparatus of FIG. 16. For simplicity of description, the explanation of these composing elements is omitted herein.

The example of FIG. 17 is different from that of FIG. 16 in that the former example is provided with a fixed-rate detector 151, that the buffer means are connected to the rear of the demultiplexer 96 and that audio buffer means 152 and image buffer means 153 are separately provided as the buffer means. Incidentally, operations of the composing elements of the example of FIG. 17 other than the reading operation controller 99, the fixed-rate detector 151 and the buffer means 152 and 153 are similar to those of the same or corresponding elements of the fourth example.

Figure 18:
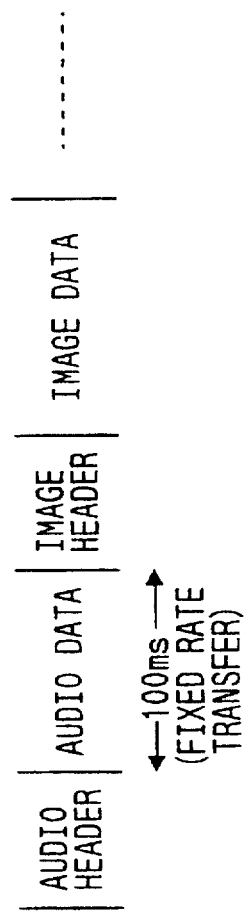
FIG. 18 is a diagram for showing an example of a recording format employed by a recording medium used by the reproducing apparatus of FIG. 17.

In case of the fifth example, an audio is recorded on the recording medium by using a fixed transfer rate as illustrated in FIG. 18. Further, a reading operation is controlled in such a manner that a transfer rate of the audio information becomes constant, as will be described later.

Information read by the information reading means 94 is immediately separated by the demultiplexer 96 into audio information and image information. Then, the audio information and the image information are inputted to the audio decoder 92 and the image decoder 97 through the buffer means 152 and 153, respectively.

Furthermore, audio information outputted from the demultiplexer 96 is also inputted to the fixed rate detector 151. In the fixed rate detector 151, an amount of codes generated in a period of the predetermined length, which are generated from audio information outputted by the demultiplexer 96 is measured. Thereafter, information representing the amount of the codes generated from the audio information is outputted to the reading operation controller 99. The amount of the codes generated by the audio information can be known by recording audio data composed of a set of audio information corresponding to each unit period of, for instance, 100 ms.

Further, the information reading means 94 is controlled according to the reading operation control information sent from the reading operation controller 99 in such a way to read information from the recording medium or to stop a reading operation.

In the reading operation controller 99, it is judged from the audio code amount information corresponding to the period of the predetermined length, which is inputted from the fixed rate detector 151, whether a value indicated by the audio code amount information is less than or more than a predetermined audio average transfer rate (namely, a predetermined average decoding rate). If less than, a reading operation is kept performed. In contrast, if more than, reading operation control information, which indicates that a reading operation is inhibited and that the information reading means is caused to stand by, is outputted to the information reading means 94. Thus information can be read in synchronization with a decoding of audio information.

In this case, image information does not affect the control of the information reading means 49. As long as the image information is recorded in such a manner that there is only a small difference between a moment at which the image information is recorded and another moment at which the corresponding audio information is recorded, information sufficient for a decoding can be obtained. Thus, there is not an occurrence of an overflow in the buffer means 153.

Regarding the speed of the response of the information reading means 94 to the control information, it is the same with the fourth example. However, it is unnecessary to record image information every period of the predetermined length as a packet of information. The control operation can be easily performed.

Incidentally, audio information is employed as an example of the fixed rate information. However, other kinds of information recorded by utilizing a fixed transfer rate may be employed instead of audio information.

While preferred embodiments of the present invention have been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A variable transfer rate coding apparatus for coding a plurality of moving picture signals in a total data stream, comprising:

temporary coding means for quantizing each of the moving picture signals in the total data stream according to a temporary quantization step width which is determined according to each of activities of the moving picture signals to produce a plurality of temporary quantized signals, changing the temporary quantized signals to a plurality of temporary variable length codes according to a variable length coding and calculating a temporary transfer rate indicating an amount of temporary variable length codes in one prescribed time period for each of prescribed time periods, the plurality of temporary transfer rates being variable with time;

target transfer rate setting means for preparing a plurality of transfer rate conversion characteristics respectively indicating the conversion of each temporary transfer rate calculated by the temporary coding means to a target transfer rate indicating an amount of target codes in one prescribed time period, selecting a particular transfer rate conversion characteristic from the plurality of transfer rate conversion characteristics to provide a prescribed value for a total amount of target codes which are determined by a plurality of target transfer rates obtained by converting the temporary transfer rates corresponding to the moving picture signals in the total data stream according to the particular transfer rate conversion characteristic, and calculating one target transfer rate from each of the temporary transfer rates according to the particular transfer rate conversion characteristic, the plurality of target transfer rates being variable with time, and each target transfer rate corresponding to one prescribed time period;

storing means for temporarily storing codes, outputting the codes at one corresponding target transfer rate for each prescribed time period, the target transfer rates for the prescribed time periods being variable with time, and outputting a buffer filling rate indicating a filling rate of the codes in the storing means; and real coding means for quantizing each of the moving picture signals in the total stream according to a real quantization step width which is determined according to each of the activities of the moving picture signals and the buffer filling rate output from the storing means to produce a plurality of real quantized signals so that a volume of variable length codes obtained from each of the real quantized signals according to the variable length coding is increased or decreased with the decrease or increase of the buffer filling rate and so that a total sum of variable length codes obtained from the real quantized signals becomes the prescribed value, changing the real quantized signals to a plurality of real variable length codes having a total volume which is equal to the prescribed value according to the variable length coding, and outputting the real variable length codes to the storing means one after another to output the real variable length codes from the storing means at one corresponding target transfer rate for each prescribed time period, the target transfer rates for the prescribed time periods are variable with time.

2. A variable transfer rate coding apparatus according to claim 1 in which the target transfer rate setting means comprises:

a code amount controller for selecting the particular transfer rate conversion characteristics; and a target transfer rate setting device for setting the target transfer rate for each prescribed time period by converting each of the temporary transfer rates into one target transfer rate according to the particular transfer rate conversion characteristic selected by the code amount controller so that increase of the target transfer rates is less than increase of the temporary transfer rates and so that a maximum value of each of the target transfer rates is lower than a constant value.

3. A variable transfer rate coding apparatus according to claim 2 in which the code amount controller comprises:

a plurality of transfer rate converting devices for respectively converting one temporary transfer rate into a converted transfer rate according to one of the transfer rate conversion characteristic for each prescribed time period;

a plurality of accumulation adders for respectively accumulating a plurality of converted transfer rates obtained from all the temporary transfer rates in each of the transfer rate converting devices and respectively generating a total amount of codes from the converted transfer rates; and a judgement device for selecting one total amount of codes having a maximum value from the total amounts generated in the accumulation adders, the selected one total amount of codes being lower than a target total code amount, and selecting one transfer rate conversion characteristic relating to the selected one total amount of codes as the particular transfer rate conversion characteristic.

4. A variable transfer rate coding apparatus according to claim 3, in which the target total code amount in the judgement device denotes a recording capacity of a recording medium.

5. A variable transfer rate coding apparatus according to claim 1 in which the temporary coding means comprises:

a quantizer for quantizing each of the moving picture signals in the total data stream according to the temporary quantization step width for each prescribed time period;

a variable length coder for calculating the temporary variable length codes from the temporary quantized signals obtained by the quantizer according to the variable length coding; and a temporary code amount counter for calculating the temporary transfer rate from the amount of the temporary variable length codes for each prescribed time period.

6. A variable transfer rate coding apparatus according to claim 1 in which the real coding means comprises:

a quantizer for quantizing each of the moving picture signals in the total data stream according to the real quantization step width for each prescribed time period;

a variable length coder for calculating the real variable length codes for each of the real quantized signals obtained by the quantizer according to the variable length coding; and a quantization controller for adjusting the real quantization step width according to the buffer filling rate output from the storing means to control the quantization performed by the quantizer.

7. A variable transfer rate information reproducing apparatus for reproducing pieces of moving picture information recorded on a recording medium, comprising:

information reading means for intermittently reading the pieces of moving picture information from the recording medium at a constant information reading rate, the pieces of moving picture information being recorded at a variable transfer rate changing every prescribed time period;

buffer means for temporarily storing the pieces of moving picture information read by the information reading means and outputting the pieces of moving picture information at an information decoding rate;

reading operation controlling means for detecting an information filling rate of the buffer means and controlling a reading operation performed by the information reading means according to the information filling rate to prevent an overflow of the pieces of moving picture information stored in the buffer means and an information empty condition of the buffer means; and decoding means for decoding the pieces of moving picture information output from the buffer means to obtain pieces of reproduced moving picture information.

8. A variable transfer rate information reproducing apparatus according to claim 7 in which the information decoding rate is equal to or lower than the constant information reading rate, the reading operation performed by the information reading means is stopped under the control of the reading operation controlling means in cases where the information filling rate is higher than a prescribed upper limit, and the reading operation stopped by the reading operation controlling means is restarted under the control of the reading operation controlling means in cases where the information filling rate is lower than a prescribed lower limit.

9. A variable transfer rate information reproducing apparatus according to claim 7 in which the information decoding rate is changeable.

10. A variable transfer rate information reproducing apparatus according to claim 7 in which the reading operation performed by the information reading means is continued under the control of the reading operation controlling means to read the pieces of moving picture information stored in the buffer means in duplicate as pieces of unnecessary information and discard the unnecessary information in cases where the information filling rate is higher than a prescribed upper limit.

11. A variable transfer rate information reproducing apparatus according to claim 7 in which the decoding means comprises:

a demultiplexer for demultiplexing each of the pieces of moving picture information to a piece of audio information and a piece of image information;

an audio decoder for decoding the pieces of audio information obtained by the demultiplexer to obtain a piece of reproduced audio information; and an image decoder for decoding the pieces of image information obtained by the demultiplexer to obtain a piece of reproduced image information.

12. A variable transfer rate information reproducing apparatus for reproducing pieces of moving picture information recorded on a recording medium, comprising:

information reading means for intermittently reading at a constant information reading rate the pieces of moving picture information and a piece of reading operation control information from the recording medium, in which the pieces of moving picture information are recorded at a variable transfer rate changing every prescribed time period;

buffer means for temporarily storing the pieces of moving picture information read by the information reading means and outputting the pieces of moving picture information at an information decoding rate;

control information separating means for separating the reading operation control information from the pieces of moving picture information read by the information reading means and controlling a reading operation performed by the information reading means according to the reading operation control information to prevent an overflow of the pieces of moving picture information stored in the buffer means and an information empty condition of the buffer means; and decoding means for decoding the pieces of moving picture information output from the buffer means to obtain pieces of reproduced moving picture information.

13. A variable transfer rate information reproducing apparatus according to claim 12 in which the information decoding rate is equal to or lower than the constant information reading rate, and the reading operation performed by the information reading means is stopped or restarted according to the reading operation control information to maintain an information filling rate of the buffer means within an allowable range.

14. A variable transfer rate information reproducing apparatus according to claim 12 in which the decoding means comprises:

a demultiplexer for demultiplexing each of the pieces of moving picture information to a piece of audio information and a piece of image information;

an audio decoder for decoding the pieces of audio information obtained by the demultiplexer to obtain a piece of reproduced audio information; and an image decoder for decoding the pieces of image information obtained by the demultiplexer to obtain a piece of reproduced image information.

15. A variable transfer rate information reproducing apparatus for reproducing pieces of moving picture information recorded on a recording medium, comprising:

information reading means for intermittently reading the pieces of moving picture information and a piece of transfer rate information from the recording medium at a constant information reading rate for each prescribed time period, in which the pieces of moving picture information are recorded at a variable transfer rate changing every prescribed time period, the transfer rate information indicating the variable transfer rate;

transfer rate information separating means for separating the transfer rate information from the pieces of moving picture information read by the information reading means;

buffer means for temporarily storing the pieces of moving picture information read by the information reading means and outputting the pieces of moving picture information at an information decoding rate;

reading operation controlling means for controlling a reading operation performed by the information reading means according to the transfer rate information obtained by the transfer rate information separating means to prevent an overflow of the pieces of moving picture information stored in the buffer means and to prevent an information empty condition of the buffer means; and decoding means for decoding the pieces of moving picture information output from the buffer means to obtain pieces of reproduced moving picture information.

16. A variable transfer rate information reproducing apparatus according to claim 15 in which the information decoding rate is equal to or lower than the constant information reading rate, and the reading operation performed by the information reading means is stopped or restarted under the control of the reading operation controlling means to maintain an information filling rate of the buffer means within an allowable range.

17. A variable transfer rate information reproducing apparatus according to claim 15 in which the decoding means comprises:
- a demultiplexer for demultiplexing each of the pieces of moving picture information to a piece of audio information and a piece of image information;
- an audio decoder for decoding the pieces of audio information obtained by the demultiplexer to obtain a piece of reproduced audio information; and
- an image decoder for decoding the pieces of image information obtained by the demultiplexer to obtain a piece of reproduced image information.

18. A variable transfer rate information reproducing apparatus for reproducing pieces of moving picture information recorder in a packet on a recording medium for each prescribed time period comprising:
- information reading means for intermittently reading the pieces of moving picture information and code amount of the pieces of the moving picture information in one packet from the recording medium at a constant information reading rates for each prescribe time period, in which the pieces of moving picture information are recorded with a changeable amount of code indicating the pieces of the moving picture information in one packet;
- packet code amount detecting means for detecting the code amount of the pieces of moving pictures information in one packet read by the information reading means for each prescribed time peroid;
- buffer means for temporarily storing the pieces moving picture information in one packet read by the information reading means for each prescribed time period and outputting the pieces of moving picture information at an information decoding rate;
- reading operation controlling means for controlling a reading operation performed by the information reading means according to the code amount obtained by the packet code amount detecting means to prevent an overflow of the pieces of moving picture information stored in the buffer means and an information empty condition of the buffer means; and
- decoding means for decoding the pieces of moving picture information output from the buffer means to obtain pieces of reproduced moving picture information.

19. A variable transfer rate information reproducing apparatus according to claim 18 in which the information decoding rate is equal to or lower than the constant information reading rate, and the reading operation performed by the information reading means is stopped or restarted under the control of the reading operation controlling means to maintain an information filling rate of the buffer means within an allowable range.

20. A variable transfer rate information reproducing apparatus according to claim 18 in which the decoding means comprises:
- a demultiplexer for demultiplexing each of the pieces of moving picture information to a piece of audio information and a piece of image information;
- an audio decoder for decoding the pieces of audio information obtained by the demultiplexer to obtain a piece of reproduced audio information; and
- an image decoder for decoding the pieces of image information obtained by the demultiplexer to obtain a piece of reproduced image information.

21. A variable transfer rate information reproducing apparatus for reproducing pieces of moving picture information recorded on a recording medium, comprising:
- information reading means for intermittently reading the pieces of moving picture information from the recording medium, the pieces of moving picture information being classified into pieces of first information recorded on the recording medium at a fixed transfer rate and pieces of second information recorded on the recording medium at a variable transfer rate changing every prescribed time period, at a constant information reading rate;
- demultiplexing means for demultiplexing the pieces of moving picture information read by the information reading means to the pieces of first information and the pieces of second information;
- first buffer means for temporarily storing the pieces of first information demultiplexed by the demultiplexing means and outputting the pieces of first information at an information decoding rate;
- second buffer means for temporarily storing the pieces of second information demultiplexed by the demultiplexing means and outputting the pieces of second information at the information decoding rate;
- fixed transfer rate detecting means for detecting the fixed transfer rate from the pieces of first information;
- reading operation controlling means for controlling a reading operation performed by the information reading means according to the fixed transfer rate detected by the fixed transfer rate detecting means to prevent an overflow of the pieces of first information stored in the first buffer means and to prevent an information empty condition of the first buffer means;
- first decoding means for decoding the pieces of first information output from the first buffer means to obtain pieces of reproduced first information; and
- second decoding means for decoding the pieces of second information output from the second buffer means to obtain pieces of reproduced second information, pieces of reproduced moving picture information being composed of the pieces of reproduced first information obtained by the first decoding means and the pieces of second information.

22. A variable transfer rate information reproducing apparatus according to claim 21 in which the information decoding rate is equal to or lower than the constant information reading rate, and the reading operation performed by the information reading means is stopped or restarted under the control of the reading operation controlling means to maintain an information filling rate of the first buffer means within an allowable range.

23. A recording medium, comprising:
- a recording region having a prescribed storing capacity value; and
- information of a plurality of moving picture signals in a total data stream being stored in the recording medium so that a sum of a plurality of real variable length codes indicating the moving picture signals in the total data stream is equal to the prescribed storing capacity value, wherein each of the moving picture signals in the total data stream is quantized according to a temporary quantization step width which is determined according to each of activities of the moving picture signals to produce a plurality of temporary quantized signals which are changed to a plurality of temporary variable length codes, a temporary transfer rate indicating an amount of temporary variable length codes in one prescribed time period being calculated for each of prescribed time periods, a plurality of target transfer conversion characteristics respectively indicating the conversion of each of the temporary transfer rates to a target transfer rate indicating an amount of target codes in one prescribed time period are prepared, a particular target transfer conversion characteristic being selected from the plurality of target transfer conversion characteristics on condition that a total amount of target codes which are determined by a plurality of target transfer rates obtained by converting the temporary transfer rates corresponding to the moving picture signals in the total data stream according to the particular target transfer conversion characteristic is the prescribed storing capacity value of the recording region, one target transfer rate being calculated from each of the temporary transfer rates according to the particular target transfer conversion characteristic on condition that the plurality of target transfer rates for the prescribed time periods are variable with time, a buffer in which codes are temporarily stored, the codes are output at one corresponding target transfer rate for each prescribed time period on condition that the target transfer rates for the prescribed time periods are variable with time and that a buffer filling rate indicating a filling rate of the codes in the buffer is output is prepared, each of the moving picture signals in the total data stream being quantized according to a real quantization step width which is determined according to each of the activities of the moving picture signals and the buffer filling rate output from the buffer to produce a plurality of real quantized signals on condition that a volume of variable length codes obtained from each of the real quantized signals is increased or decreased with the decrease or increase of the buffer filling rate and that a total sum of variable length codes obtained from the real quantized signals becomes the prescribed storing capacity value of the recording region, the real quantized signals being changed to the plurality of real variable length codes of which a total volume is equal to the prescribed storing capacity value of the recording region, the real variable length codes being temporarily stored in the buffer one after another, and the real variable length codes stored in the buffer are recorded in the recording region of the recording medium at one corresponding target transfer rate for each prescribed time period on condition that the plurality of target transfer rates for the prescribed time periods are variable with time.

24. A recording medium according to claim 23, further comprising:

reading operation control information stored in the recording medium, wherein the information of the moving picture signals in the total stream and the reading operation control information are intermittently read from the recording region of the recording medium at a constant information reading rate, the reading operation control information is separated from the information of the moving picture signals, the information of the moving picture signals is temporarily stored in a buffer unit and is output at an information decoding rate, a reading operation is controlled according to the reading operation control information to prevent an overflow of the information of the moving picture signals stored in the buffer unit and an information empty condition of the buffer unit, and the information of the moving picture signals output from the buffer unit is decoded to obtain pieces of reproduced moving picture information.

* * * * *

UNITED STATES PATENT AND TRADEMARK OFFICE
CERTIFICATE OF CORRECTION

PATENT NO. : 5,790,745
DATED : August 4, 1998
INVENTOR(S) : Kenji SUGIYAMA, Kanji KAYANUMA, Ichiro ANDO It is certified that error appears in the above-identified patent and that said Letters Patent is hereby corrected as shown below:

Col. 4, lines 59-60, replace "is recorded" by --generated--;

line 61, after "apparatus" insert --is recorded--;

line 66-Col. 5, line 1, replace "and recorded on a recording medium by changing" by --at--;

Col. 5, line 2, after "rate" insert --changing every prescribed time period and recorded on a recording medium--.

Col. 6, line 44, replace "is recorded" by --generated--;

line 46, after "invention" insert --is recorded--.

UNITED STATES PATENT AND TRADEMARK OFFICE
CERTIFICATE OF CORRECTION

PATENT NO. : 5,790,745
DATED : August 4, 1998
INVENTOR(S) : Kenji SUGIYAMA, Kanji KAYANUMA, Ichiro ANDO It is certified that error appears in the above-identified patent and that said Letters Patent is hereby corrected as shown below:

line 64, replace "is recorded" by --coded--;

same line, after "rate" insert --is recorded--;

Col. 7, line 8, replace "is recorded" by --coded--;

line 8, after "rate" insert --is recorded--;

line 16, replace "recorded on a recording medium by" by --coded while--;

line 17, after "time" insert --and recorded on a recording medium--.

line 31, replace "recorded on a recording medium by" by --coded while--;

UNITED STATES PATENT AND TRADEMARK OFFICE
CERTIFICATE OF CORRECTION

PATENT NO. : 5,790,745
DATED : August 4, 1998
INVENTOR(S) : Kenji SUGIYAMA, Kanji KAYANUMA, Ichiro ANDO It is certified that error appears in the above-identified patent and that said Letters Patent is hereby corrected as shown below:

line 32, after "time" insert --and recorded on a recording medium--.

lines 58-59, replace "to be recorded by" by --coded while--.

Col. 8, lines 7 and 8, replace "is recorded as a packet of information by" by --coded while--;

line 8, replace "each" by --every--;

line 9, after "time" insert --is recorded as a packet of information--.

line 21 replace "to be recorded by" by --coded while--;

lines 22, replace "to be recorded by" by --coded while--;

UNITED STATES PATENT AND TRADEMARK OFFICE
CERTIFICATE OF CORRECTION

PATENT NO. : 5,790,745
DATED : August 4, 1998
INVENTOR(S) : Kenji SUGIYAMA, Kanji KAYANUMA, Ichiro ANDO It is certified that error appears in the above-identified patent and that said Letters Patent is hereby corrected as shown below:

line 23, replace "each period of" by --every--;

line 23, replace "length" by --period of time--.

Col. 9, line 17, replace "recorded at" by --coded at a--;

same line after "rate" insert --changing every predetermined period of time and recorded on the recording medium--.

Col. 16, line 18, replace "recorded" by --coded--;

same line, after "rate" insert --changing every predetermined period of time and recorded on the recording medium--.

UNITED STATES PATENT AND TRADEMARK OFFICE
CERTIFICATE OF CORRECTION

PATENT NO. : 5,790,745
DATED : August 4, 1998
INVENTOR(S) : Kenji SUGIYAMA, Kanji KAYANUMA, Ichiro ANDO It is certified that error appears in the above-identified patent and that said Letters Patent is hereby corrected as shown below:

Col. 16, line 18, replace "recorded" by --coded--;

same line, after "rate" insert --changing every predetermined period of time and recorded on the recording medium--.

Signed and Sealed this

Eleventh Day of January, 2000

Attest:

Q. TODD DICKINSON

Attesting Officer

Acting Commissioner of Patents and Trademarks